(12) United States Patent
Yagisawa et al.

(10) Patent No.: US 7,028,800 B2
(45) Date of Patent: Apr. 18, 2006

(54) SEAT ATTACHMENT STRUCTURE FOR A SCOOTER-TYPE VEHICLE

(75) Inventors: Katsuichi Yagisawa, Saitama (JP); Junji Kikuno, Saitama (JP); Kengo Yano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 45 days.

(21) Appl. No.: 10/100,046

(22) Filed: Mar. 19, 2002

(65) Prior Publication Data

US 2002/0189877 A1    Dec. 19, 2002

(30) Foreign Application Priority Data

Mar. 26, 2001    (JP)    ............................. 2001-088603

(51) Int. Cl.
*B62J 1/00*    (2006.01)
*B62J 7/02*    (2006.01)

(52) U.S. Cl. .................. 180/219; 70/258; 224/413; 224/427

(58) Field of Classification Search ................ 180/219; 70/275, 264, 258; 292/28, 50, 216, 201; 297/188.09, 188.1, 188.03, 37.1; 224/413, 224/427

See application file for complete search history.

(56) References Cited

U.S. PATENT DOCUMENTS

| 4,331,353 A | * | 5/1982 | Yazawa et al. | ................ 292/28 |
| 4,374,597 A | * | 2/1983 | Mochida | .......................... 292/8 |
| 4,907,428 A | * | 3/1990 | Nakashima et al. | .......... 70/264 |
| 5,040,632 A | * | 8/1991 | Fujii et al. | ................... 180/219 |
| 5,107,949 A | * | 4/1992 | Gotoh et al. | ................. 180/219 |
| 5,433,286 A | * | 7/1995 | Kumamaru et al. | ......... 180/219 |
| 5,533,783 A | * | 7/1996 | Harms et al. | ........... 297/195.13 |
| 5,647,450 A | * | 7/1997 | Ogawa et al. | ............... 180/220 |

FOREIGN PATENT DOCUMENTS

EP    0583532    *    2/1994

(Continued)

OTHER PUBLICATIONS

Patent Abstracts of Japan, Nov. 30, 1998, Vol. 1998, No. 13 (abstract of JP 10 203443 A).

(Continued)

*Primary Examiner*—Anne Marie Boehler
(74) *Attorney, Agent, or Firm*—Birch, Stewart, Kolasch & Birch, LLP

(57) ABSTRACT

A seat attachment structure for a vehicle having a seat hinge attached at one end of a seat, a first seat hook attached at the other end of the seat, a second seat hook attached substantially at the center of the seat, and a main locking mechanism and a sub-locking mechanism connected by a second cable. When locking the main locking mechanism, the sub-locking mechanism may also be brought into the locked state in conjunction therewith, and thus the seat can be locked easily and reliably. In addition, by providing a seat hook for the main locking mechanism at the other end of the seat, the seat hook for the main locking mechanism may be positioned at the farthest point form the hinge attached at one end of the seat. Therefore, when locking the main locking mechanism by pressing the end of the seat above the main locking mechanism downward by hand, a downward pressing force required to be exerted on the seat for generating a moment about the hinge may be reduced.

14 Claims, 20 Drawing Sheets

FOREIGN PATENT DOCUMENTS

| | | |
|---|---|---|
| EP | 1 063 153 A | 12/2000 |
| EP | 1 063 160 A | 12/2000 |
| JP | 3-79483 * | 4/1991 |
| JP | 10-203443 A | 8/1998 |

OTHER PUBLICATIONS

Patent Abstracts of Japan, Feb. 26, 1999, Vol. 1999, No. 2 (abstract of JP 10 297566 A).

* cited by examiner

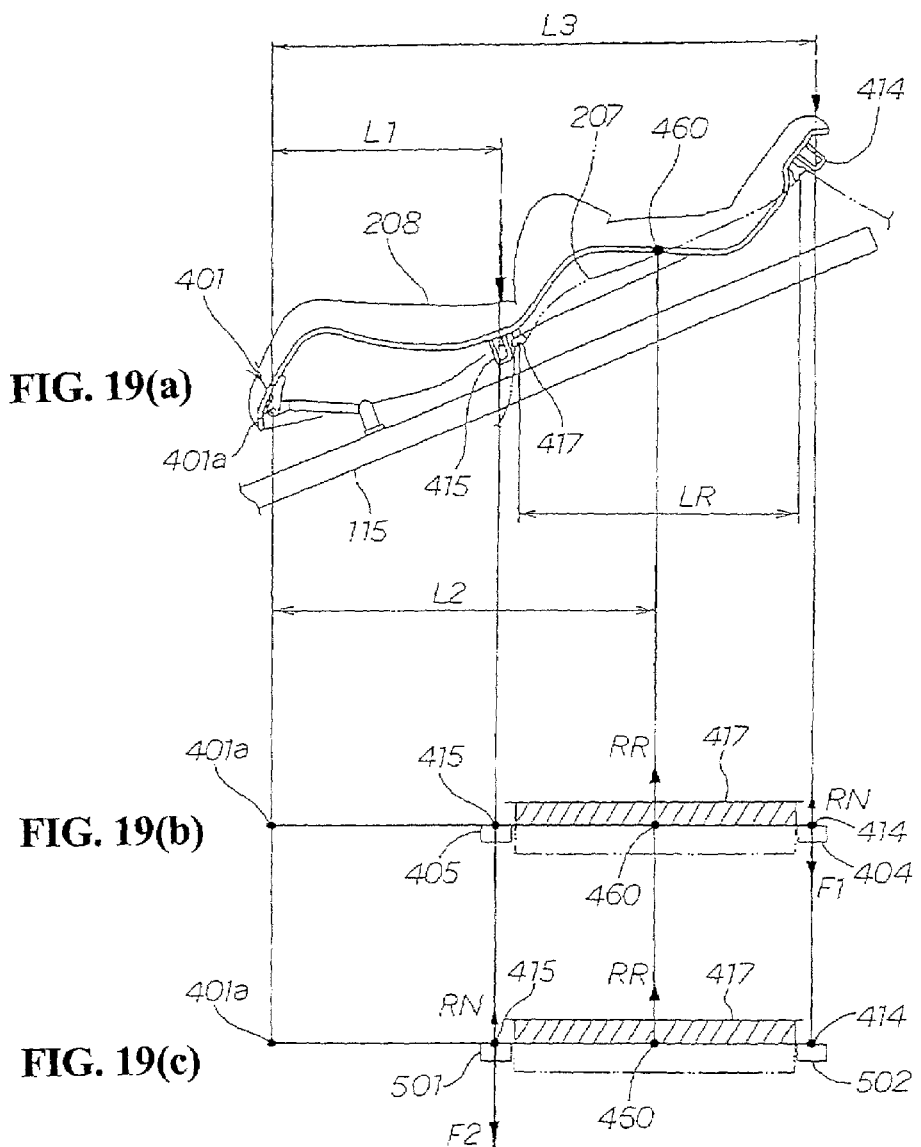

SEAT ATTACHMENT STRUCTURE FOR A SCOOTER-TYPE VEHICLE

CROSS-REFERENCE TO RELATED APPLICATIONS

The present application claims priority under 35 U.S.C. §119 to Japanese Patent Application No. 2001-088603, filed on Mar. 26, 2001, the entire contents thereof are hereby incorporated by reference.

BACKGROUND OF THE INVENTION

1. Field of the Invention

The present invention relates to a seat attachment structure for scooter-type vehicles in which the seat can be locked reliably with a small operating physical force.

2. Description of Background Art

The scooter-type vehicle employs a structure in which the seat is hinged and provided with a storage space under the seat for storing a helmet or the like.

As an attachment structure of the seat of this type, for example, "Seat attachment structure for scooter-type vehicles" disclosed in Japanese Patent Laid-Open No. 203443/1998 is known.

In FIG. 2 of the aforementioned publication, a seat attachment structure in which a first angular U-shaped fitting 58 and a second angular U-shaped fitting 59 are mounted under the hinged seat 16 that is to be used by both of the driver and the occupant, the first angular U-shaped fitting 58 is engaged with the first seat locking mechanism 100 mounted on the vehicle body, and the second angular U-shaped fitting 59 is engaged with the second seat locking mechanism 120 is disclosed.

As shown in FIG. 11 of the aforementioned publication, a technology in which the first seat locking mechanism 100 is provided with a locking claw 104 and a relay arm 108 for maintaining the locking claw 104 in the locked condition by being pressed against the locking claw 104, and as shown in FIG. 13 of the aforementioned publication, the second seat locking mechanism 120 is provided with a locking claw 124, and the relay arm 108 and the locking claw 124 are connected by the second wire 136 is disclosed.

In the aforementioned technology, the seat 16 is large. When closing the seat, the seat 16 must be closed so that engagement between the first angular U-shaped fitting 58 and the first seat locking mechanism 100 and engagement between the second angular U-shaped fitting 59 remote from the first angular U-shaped fitting 58 and the second seat locking mechanism 120 occur almost simultaneously. This is necessary because of the effect of the dimensional accuracy or the accuracy of attachment to the vehicle body of the first and the second angular U-shaped fittings 58, 59, and the first and the second seat locking mechanisms 100, 120, or of rigidity of the seat 16. As such, the portion of the seat 16 above the first and the second angular U-shaped fittings 58, 59 must be pressed with a large force, or the seat 16 must be fully opened and then closed again so as to make these two points are completely engaged with each other. Therefore, improvement in operationality of the seat 16 has been desired.

Accordingly, it is an object of the present invention is to improve the seat attachment structure for scooter-type vehicles, in which the seat can be locked reliably with a smaller operating physical force.

SUMMARY AND OBJECTS OF THE INVENTION

The present invention comprises a vehicle having an opening of the storage box for storing a helmet or the like which is closed by a seat elongated in the fore-and-aft direction and attached with a hinge so as to be opened and closed freely, a plurality of seat hooks attached on the lower surface of the seat, and a main locking mechanism and a sub-locking mechanism attached on the vehicle body for being engaged with the seat hooks, so that the seat is locked by the main and sub-locking mechanism. The hinge is attached at one end of the seat, the seat hook for the main locking mechanism is attached at the other end of the seat, the seat hook for the sub-locking mechanism is attached substantially at the center of the seat, and the main locking mechanism and the sub-locking mechanisms are connected by a connecting member such as a wire or the like. Thus, when the main locking mechanism is locked by the external force, the sub-locking mechanism is also brought into the locked state in conjunction therewith.

When locking the main locking mechanism, the sub-locking mechanism is also brought into the locked state in conjunction therewith. Therefore, the locking of the main and sub-locking mechanisms may be performed easily and reliably as a single operation. Consequently, the present invention eliminates the requirement of getting used to the operation of the seat, as in the case of the related art, in which a plurality of locking mechanisms are provided at a plurality of locations.

By providing a seat hook for the main locking mechanism at the other end of the seat, the seat hook for the main locking mechanism may be positioned at the farthest point from the hinge attached at one end of the seat. Therefore, when locking the main locking mechanism by pressing the end of the seat above the main locking mechanism downward by hand, a downward force required to be exerted on the seat for generating a moment about the hinge may be reduced. For example, according to the present invention, only a small operating force pressing on the central portion of the seat is required for locking the seat. By contrast, in conventional structures in which the seat hook for the main locking mechanism is attached at the center of the seat, and the seat hook for the sub-locking mechanism is attached at the other end of the seat, a larger force is required.

In the present invention, each of the seat hooks is formed into an angular U-shape having a straight portion along the length of the seat so that the straight portions are engaged with the main and sub locking mechanisms respectively.

Thus, in the present invention, any problems in locking the main and sub-locking mechanisms that might result from dimensional errors of the seat hook, the main locking mechanism, and the sub locking mechanism, errors in attachment of these members, or the errors in engaging the seat hook and each locking mechanism due to the rigidity of the seat, are eliminated due to the length of the seat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 19(a)–(c) are first explanatory drawings illustrating the operation of the seat attachment structure of the motorcycle according to the present invention;

DETAILED DESCRIPTION OF THE PREFERRED EMBODIMENTS

Figure 1:
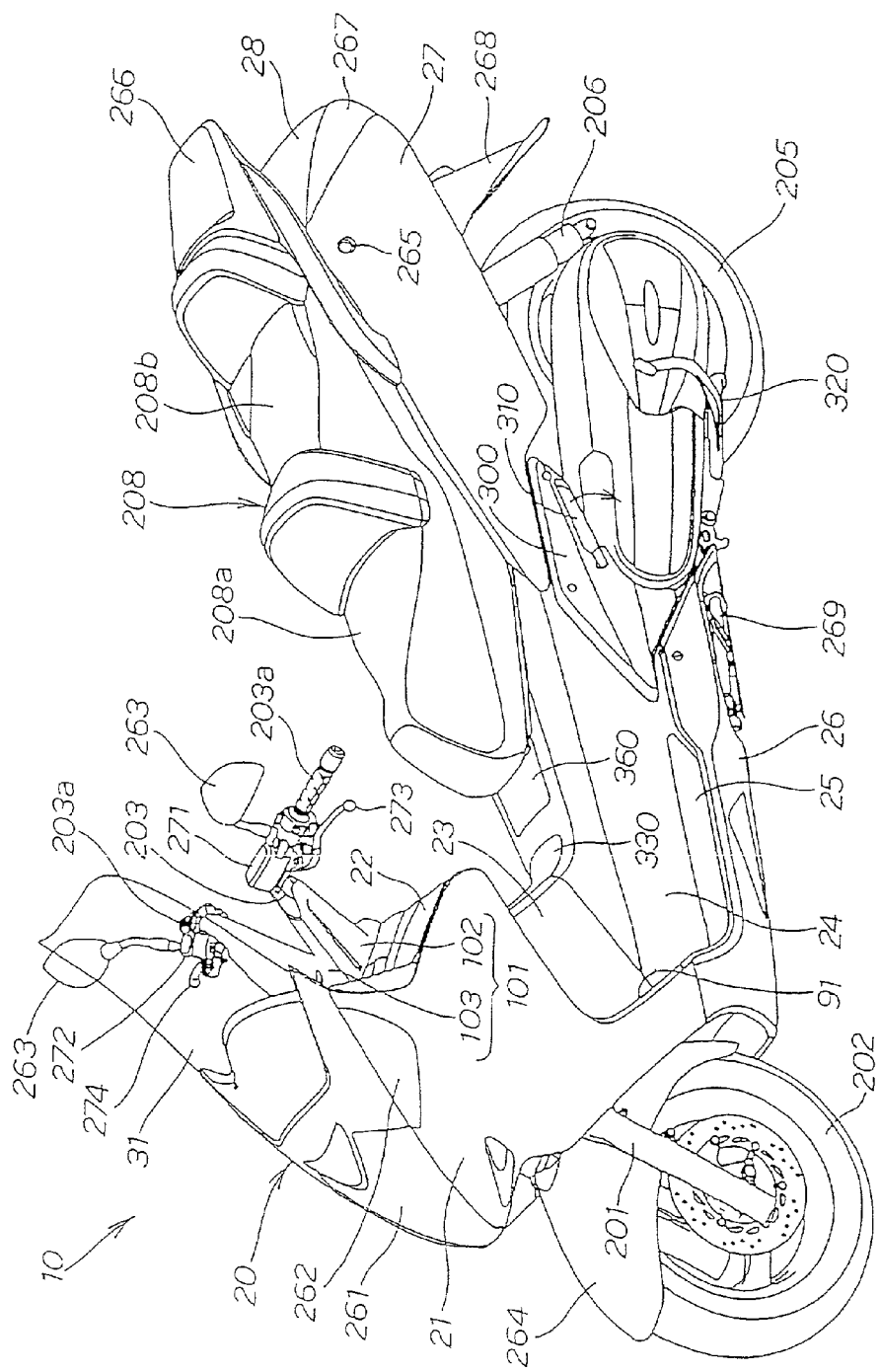
FIG. 1 is an outline view showing the left side of the scooter-type vehicle employing the seat attachment structure according to the present invention.

Referring now to the drawings, an embodiment of the present invention will be described below. The terms "front", "rear", "left", "right", "upper", "lower" represent the direction viewed from the driver. The drawings are to be viewed in the direction in which the reference numerals are shown in the right way.

FIG. 1 is an outline view showing the left side of the scooter-type vehicle employing the seat attachment structure according to the present invention, showing that the motorcycle 10 is a scooter-type vehicle having a low deck floor 25.

A vehicle body cover 20 for covering the entire vehicle body frame of the motorcycle 10 comprises a front cowl 21 for covering the front portion of the vehicle body frame that will be described later and the upper portion of the front wheel, an upper cover 22 for covering the upper opening of the front cowl 21, an inner cover 23 for covering the rear portion of the front cowl 21, and a center cover 24 extending rearward from the rear end of the inner cover 23 for covering the longitudinal center of the vehicle body frame. A low deck floor 25 extends outward from the outer edge of the lower end of the center cover 24 for placing the feet of the driver, a floor skirt 26 extends downward from the outer edge of the low deck floor 25, a rear side cover 2 extends rearward from the center cover 24 for covering the rear side portion of the vehicle body frame, and a rear cover 28 extends rearward from the rear end of the rear side cover 27 for covering the rear portion of the vehicle body frame.

The front cowl 21 is provided with a transparent windscreen 31 thereon. The inner cover 23 is provided with a leg shield 91 for covering the front portion of the driver's legs.

The motorcycle 10 further comprises a handle 203 at the front of the vehicle body, and a seat 208 and a step holder 300 at the rear of the vehicle body.

The handle 203 has a similar configuration as the so-called chopper-type handle, having grips 203a, 203a at the relatively high positions and extending rearward. The handle 203 is covered by a handle cover 101. The handle cover 101 comprises a lower handle cover 102 for covering the lower portion of the handle 203 on the left and right sides, and an upper handle cover 103 for covering the upper portion of the handle 203.

The seat 208 is a double seat comprising a front portion of the seat 208a for a driver and the rear portion of the seat 208b for an occupant. The step holder 300 is disposed adjacent the rear portion of the center cover 24 and provided with a pillion step for placing the occupant's foot (step for occupant) 310 mounted in such a manner that it can be stored and exposed.

In the drawing, the reference numeral 261 designates a headlamp, the numeral 262 designates a winker, the numerals 263, 263 designate mirrors, the numeral 264 designates a front fender, the numeral 265 designates a seat lock, the numeral 266 designates a rear air spoiler, the numeral 267 designates a tail lamp, the numeral 268 designates a rear fender, the numeral 269 designates an auxiliary stand, and the numeral 320 designates a main stand.

The reference numerals 271, 272 designate master cylinders for generating a liquid pressure for braking by the operation of brake levers 273, 274.

Figure 2:
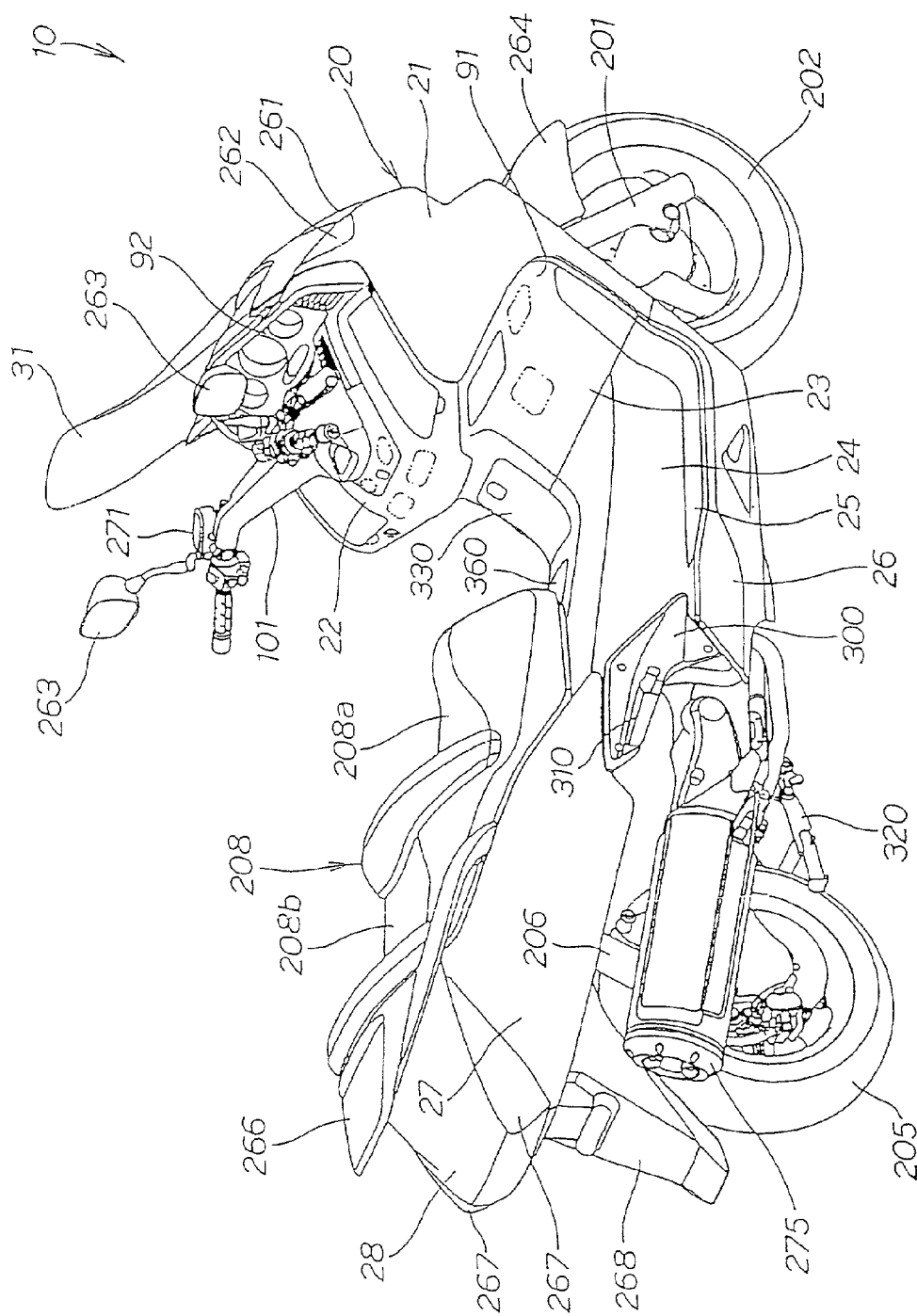
FIG. 2 is an outline view showing the right side of the motorcycle according to the present invention.

FIG. 2 is an outline view showing the right side of the motorcycle according to the present invention, showing a meter panel 92 provided above the front cowl 21 behind the windscreen 31. As is clear from the description given so far, the front portion of the vehicle body may be provided with the windscreen 31, the leg shield 91, and the meter panel 92.

The same figure further shows that another step holder 300 having another pillion step 310 is provided on the right side of the motorcycle 10 as well. The reference numeral 275 designates an exhaust muffler.

Figure 3:
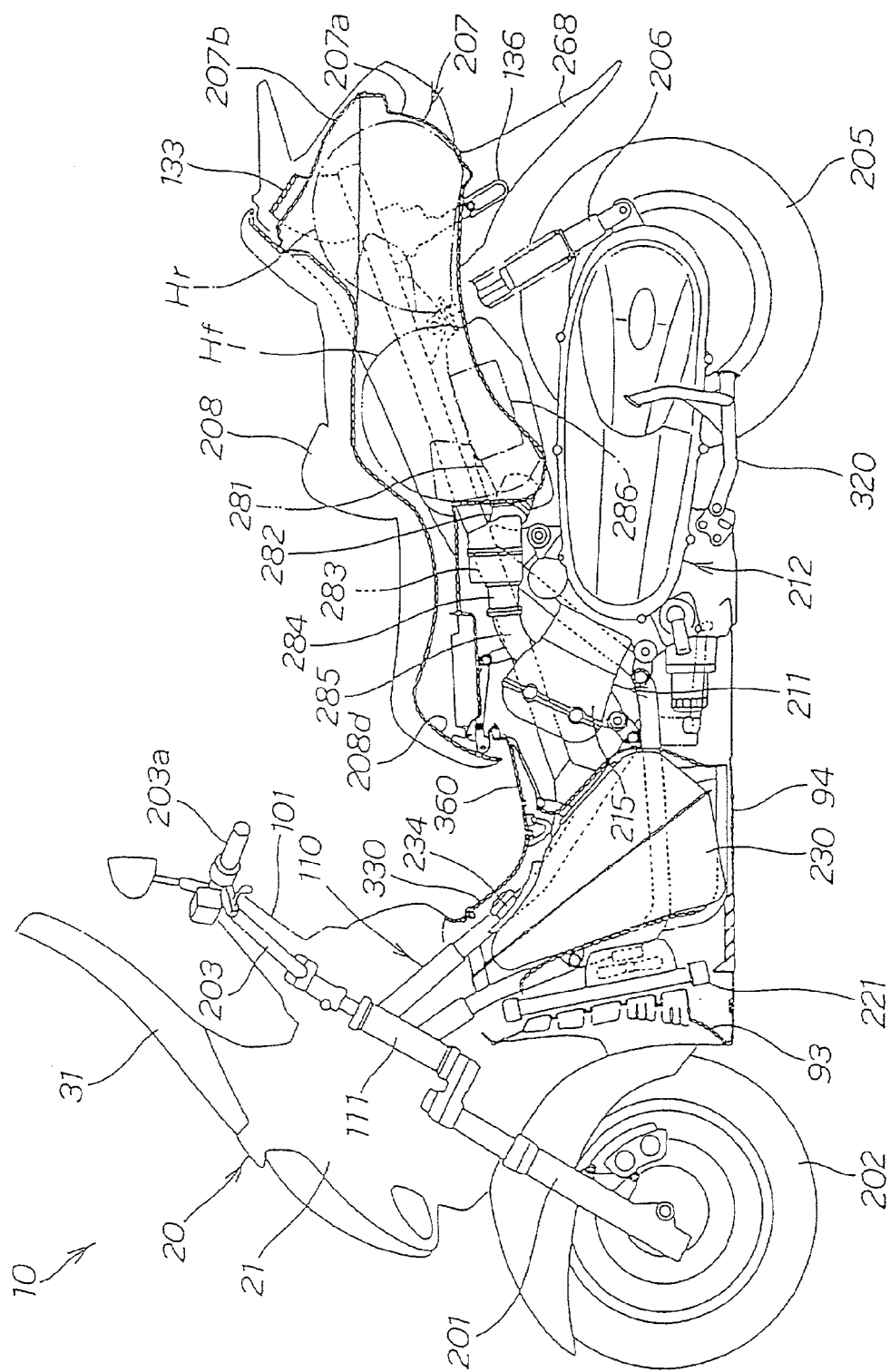
FIG. 3 is a sectional side elevation of the motorcycle according to the present invention.

FIG. 3 is a sectional side elevation of the motorcycle according to the present invention, viewed from the left side of the motorcycle 10. The motorcycle 10 is a scooter-type vehicle mainly comprising a vehicle body frame 110, a front fork 201 mounted on the head pipe 111 of the vehicle body frame 110 so as to be capable of a lateral swinging motion, a front wheel 202 mounted on the front fork 201, the aforementioned handle 203 connected to the front fork 201, and an engine 211 mounted on the rear portion of the vehicle body flame 110. The motorcycle also comprises a power transmission mechanism 212 capable of a vertical swinging motion about a crankshaft of the engine 211, a rear wheel 205 mounted on the rear portion of the power transmission mechanism 212, a rear cushion unit 206 suspending the rear end portion of the power transmission mechanism 212 from the vehicle body frame 110, and a storage box 207 mounted over the rear portion of the vehicle body frame 110. The aforementioned seat 208 is arranged on the storage box 207 so as to be hinged.

The front fork 201 is a fork in the shape of an inverted angular U disposed below the head pipe 111. The upper portion of the front fork 201 and the head pipe 111 are covered by the front cowl 21.

The engine 211 is a water-cooled 2-cylinder engine slightly inclined with a cylinder head 215 facing toward the upper front, and disposed substantially horizontally. The power transmission mechanism 212 is a belt converter non-stage transmission with a centrifugal clutch in which the power of the engine 211 is transmitted to the rear wheel 205.

The storage box 207 is a box elongated in the direction along the length of the vehicle body so that two helmets Hf, Hr can be stored in tandem, and comprises a lower box 207a and an upper box 207b placed on the rear portion of the lower box 207a. In the figure, the reference numeral 281 designates an air cleaner, the numeral 282 designates a connecting tube, the numeral 283 designates an air chamber, the numeral 284 designates a throttle valve, the numeral 285 designates an inlet pipe, and the numeral 286 designates a buttery.

Figure 4:
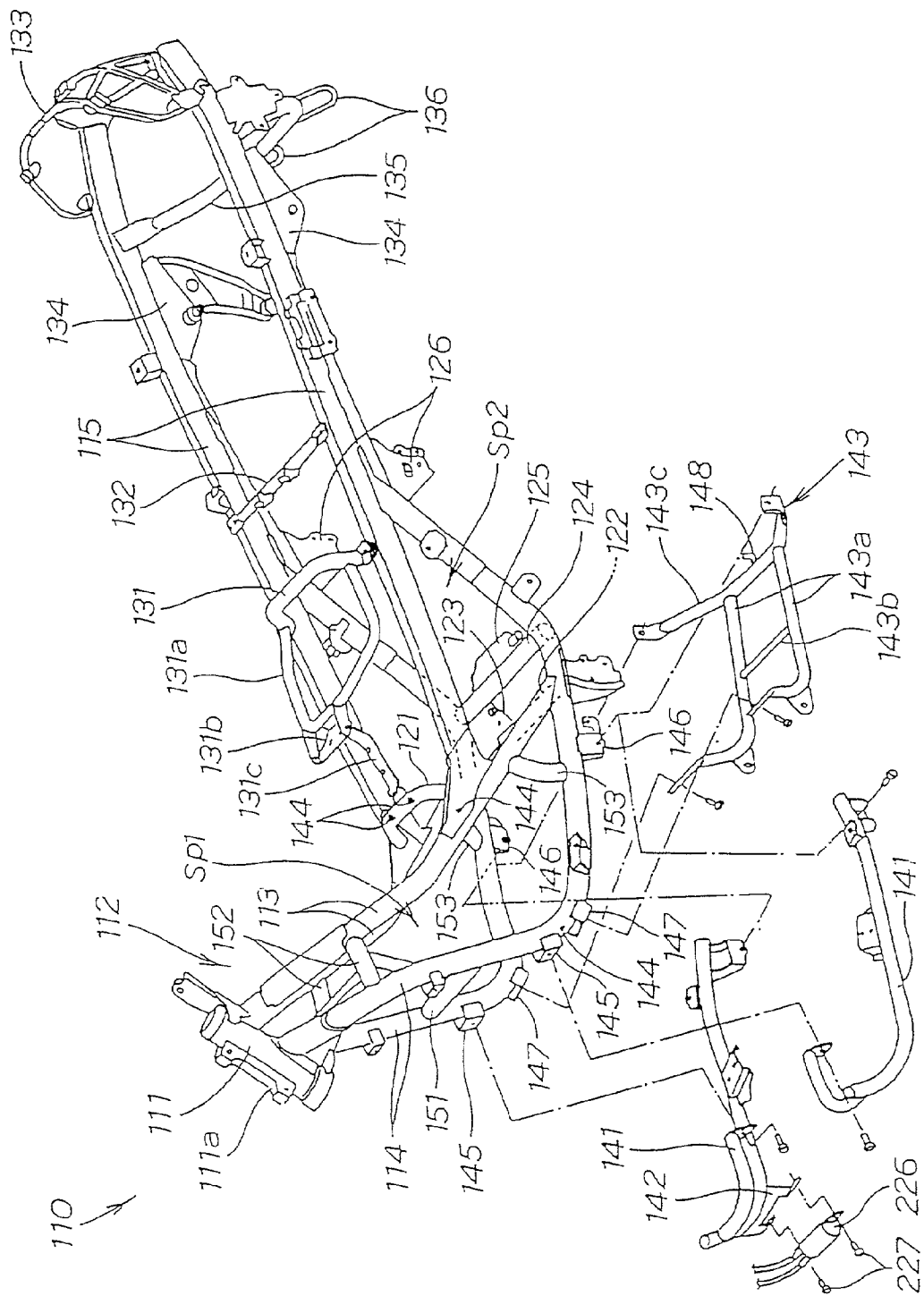
FIG. 4 is a perspective view of the vehicle body frame of the motorcycle according to the present invention.

FIG. 4 is a perspective view of the vehicle body frame of the motorcycle according to the present invention. The vehicle body frame 110 is a double cradle type integral frame comprising a front frame 112 continuing to the head pipe 111 and a pair of left and right rear frames 115, 115 extending rearward from the rear portion of the front frame 112 joined by welding. The head pipe 111 is provided with a cowl stay bracket 111a.

The front frame 112 comprises a pair of left and right upper frames 113, 113 extending downward toward the rear from the head pipe 111, a pair of left and right down tubes 114, 114 extending downward from the head pipe 111 at the position below the pair of upper frames 113, 113, and the pair of down tubes 114, 114. These down tubes 114, 114 extend rearward from the lower ends thereof, connected to the lower ends of the pair of upper frames 113, 113, and then further extend upward toward the rear. With the front frame 112 of such a construction, a space Sp1 is provided, the space Sp1 having a substantially triangle in side view defined by a pair of upper frames 113, 113 and a pair of down tubes 114, 114.

A first cross member 121 in the shape of an inverted angular U in front view is laid between the front end of a left rear frame 115 and the front end of a right rear frame 115, and a second cross member 122 is laid between the lower end of the left upper frame 113 and the lower end of the right upper frame 113. Also, a first engine bracket 123 is connected to the second cross member 122 at the center of the vehicle width.

A third cross member 124 is laid between the rear end of the horizontal portion of the left down tube 114 and the rear end of the horizontal portion of the right down tube 114, a second engine bracket 125 is connected to the third cross member 124 at the center of the vehicle width, and the left and right third engine brackets 126, 126 are connected to rear ends of the left and right down tubes 114, 114.

The pair of left and right rear frames 115, 115, each being a member of vertically elongated cross section, are connected at one of the ends to the midsections along the lengths of the pair of left and right upper frames 113, 113, and extended rearward from the other ends thereof. The "vertically elongated cross section" here means a cross section of which the longitudinal dimension is larger than the lateral dimension. More specifically, the rear frames 115, 115 are formed of square pipe of vertically elongated rectangular cross section.

The present invention also includes three cross members 131 to 133 detachably laid between the pair of left and right rear frames 115, 115. More specifically, a frontmost rear cross member 131, a middle rear cross member 132, and a rearmost rear cross member 133 are laid between the left and right rear frames 115, 115, in this order from the front.

These three cross members 131 to 133 are placed on the upper surface of the rear frames 115, 115 and secured with bolts. Since the rear frames 115, 115 are of square pipe, it is easy to place and attach these three cross members 131 to 133 thereon.

The frontmost rear cross member 131 is a member in the shape of an inverted angular U in front view, having a U-shaped stay 131a opening toward the rear in plan view and extending forward from the left and right standing portions. A seat hinge supporting portion 131b is connected to the front end of the U-shaped stay 131a, and an extension member 131c is connected to the front end of the U-shaped stay 131a so as to extend forward. Further, the extension member 131c is secured at the front end thereof to the first cross member 121 with a bolt. The middle rear cross member 132 is a bar-shaped member, and the rearmost rear cross member 133 is formed of die casting aluminum and is a U-shaped band member opening toward the front in plan view. Since the rearmost cross member 133 is attached with bolts to the rear ends of rear frames 115, 115, an increase in rigidity of the rear frames 115, 115 is prevented. This provides a good effect on the ride quality.

The left and right rear frames 115, 115 are also provided with left and right cushion brackets 134, 134 connected at the rear portion thereof. Lower rear cross member 135 of substantially U-shape in front view is laid between the rear portions of the left and right rear frames 115, 115, and left and right carrier hooks 136, 136 are connected to the lower rear cross member 135.

FIG. 4 also shows that a pair of left and right floor supporting stays 141, 141 and an under frame 143 are detachably mounted on the aforementioned vehicle body frame 110, and a plurality of headed pins 144 . . . (" . . . " designates plural number, hereinafter) are mounted thereon. More specifically, the left and right floor supporting stays 141, 141, being members for supporting the low deck floor 25 (See FIG. 1), are to be attached to the brackets 145, 145, 146, 146 of the left and right down tubes 114, 114 with bolts. The right floor supporting stay 141 is a member comprising an ignition coil 226 for the engine detachably attached under the front end thereof via a stay 142 with bolts 227, 227. The ignition coil 226 attached under the down tube 114 is to be arranged below the level of the low deck floor 25.

The under frame 143 is a member laid between the horizontal portions of the left and right down tubes 114, 114 so as to be suspended therefrom, and is to be attached to the brackets 146, 146, 147, 147 of the down tubes 114, 114 with bolts. The under frame 143 in such a construction comprises left and right side members 143a, 143a extending along the horizontal portions of the down tubes 114, 114, a central cross member 143b laid between the elongated central portions of the side members 143a, 143a, and a rear cross member 143c laid between the rear ends of the side members 143a, 143a. The reference numeral 148 is a hook for hooking a heat shielding plate for the fuel tank, which will be described later.

The headed pins 144 . . . are members for hooking the heat shielding plate for the fuel tank, which will be described later. Six of these headed pins in total are provided at the outside portions of the left and right upper frames 113, 113 and of the left and right down tubes 114, 114, and on the front portion of the first cross member 121 on the left and right positions. In FIG. 4, the reference numeral 151 designates a front cross member, and the numerals 152, 152, 153 designate stays.

Figure 5:
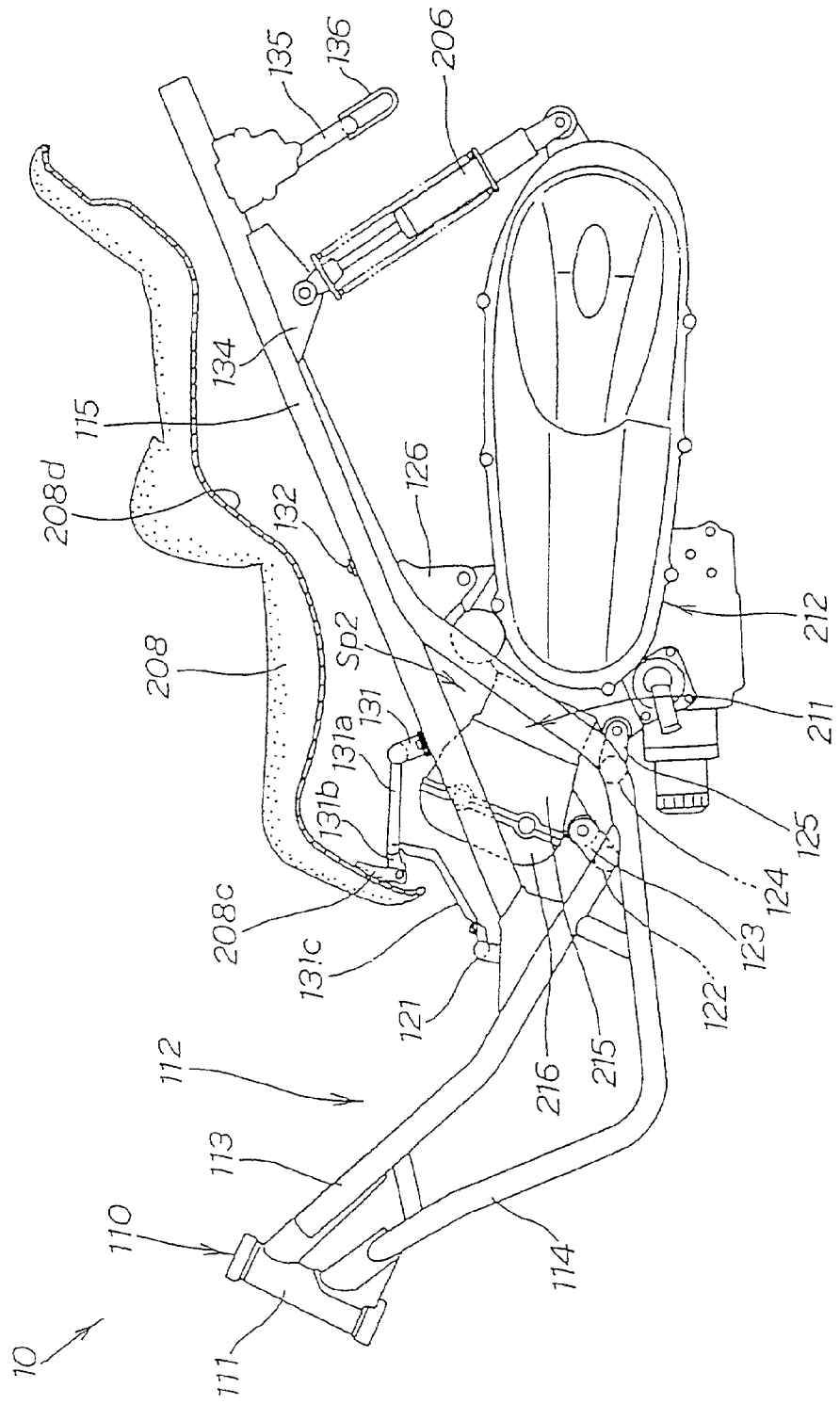
FIG. 5 is a left side view of the vehicle body frame, the engine, the power transmission mechanism, and a seat of the motorcycle according to the present invention.

FIG. 5 is a left side view of the vehicle body frame, the engine, the power transmission mechanism, and a seat of the motorcycle according to the present invention showing a state in which the engine 211 and the power transmission mechanism 212 are arranged rearwardly of the front frame 112 and downwardly of the pair of rear frames 115, 115. The engine 211 is attached in the vicinity of the connecting portions between the front frame 112 and the left and right rear frames 115, 115 (only the left one of them is shown in the figure, hereinafter).

More specifically, a space Sp2 of substantially triangular in side view is defined by the pair of upper frames 113, 113, the pair of down tubes 114, 114, and the pair of rear frames 115, 115 is provided at the rear of the front frame 112, and a cylinder head 215 and a head cover 216 of the engine 211 are arranged in the space Sp2. The lower front portion of the engine 211 is attached to the first engine bracket 123, the lower rear portion of the engine 211 is attached to the second engine bracket 125, and the upper rear portion of the engine 211 is attached to the third engine brackets 126, 126. The frontmost and middle rear cross members 131, 132 are arranged above the engine 211.

This figure also shows that (1) the rear end portion of the power transmission mechanism 212 is suspended by the left and right cushion brackets 134, 134 via the left and right rear cushion units 206, 206, and (2) the frontmost rear cross member 131 also serves as a member for supporting the movable portion 208c of the seat hinge of the hinged seat 208. In this way, the rear cushion units 206, 206 and the seat 208 can be supported by the rear frames 115, 115.

The reference numeral and sign 208d designate a seat bottom plate provided at the bottom portion of the seat 208 as a lower surface of the seat.

Figure 6:
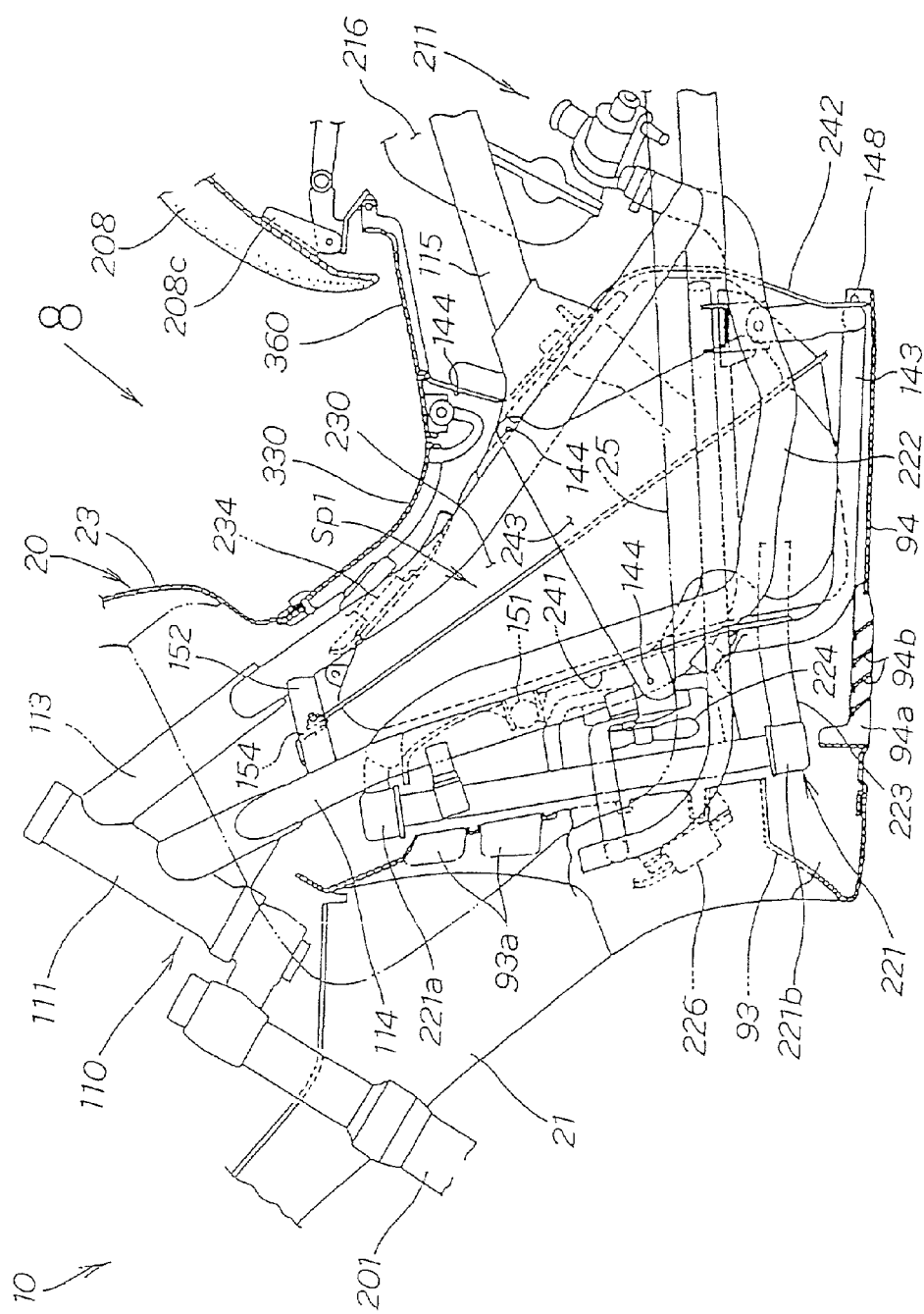
FIG. 6 is a sectional side elevation of the front lower portion of the motorcycle according to the present invention.

FIG. 6 is a sectional side elevation of the front lower portion of the motorcycle according to the present invention, viewed from the left side of the motorcycle 10. FIG. 6 shows the engine 211 disposed at the rear of the low deck floor 25 (shown in phantom), a radiator 221 for cooling the engine disposed at the front of the floor 25, the ignition coil 226 disposed under the front portion of the floor 25, and the fuel tank 230 disposed between the engine 211 and the radiator 221. In other words, the radiator 221 is disposed forwardly of the engine 211 and of the left and right down tubes 114, 114 (only the left one of them is shown in the figure, hereinafter).

The return pipe 222 for returning the coolant from the engine 211 to the radiator 221 is a hose passing along the left side (the near side of the figure) of the vehicle body with respect to the center of the vehicle width. More specifically, the return pipe 222 connected to the liquid return port of the engine 211 extends along the horizontal portion of the left down tube 114 and then the vertically extending portion at the front thereof, and is connected to the upper header 221a of the radiator 221.

The feed pipe 223 for feeding the coolant from the radiator 221 to the engine 211 is a hose passing along the right side (the far side in the figure) of the vehicle body with respect to the center of the vehicle width. More specifically, the feed pipe 223 connected to the lower header 221b of the radiator 221 extends rearward along the horizontal portion of the right down tube 114 (on the far side in the figure) and is connected to the liquid port of the engine 211. The reference numeral 224 designates a radiator fan.

The ignition coil 226 is arranged on the right side opposite from the return pipe 222 with respect to the center of the vehicle width (the far side in the figure) and forwardly of the radiator 221.

In this way, the ignition coil 226 may be disposed at the position which is free from (1) thermal effect from the engine 211, (2) thermal effect from the exhaust air from the radiator 221, and (3) thermal effect from the return pipe 222.

The fuel tank 230 is disposed in the space Sp1 of substantially triangular in side view defined by the pair of left and right upper frames 113, 113 and the pair of left and right down tubes 114, 114. The fuel tank 230 is a container having a configuration in which the upper front is tapered along the upper frames 113, 113 and the down tubes 114, 114 when viewed from the side of the vehicle body as shown in the figure. This arrangement most effectively utilizes the space Sp1. The lower portion of fuel tank 230 extends downward to the level below the down tubes 114, 114. The fuel tank 230 may be protected by covering the lower portion of the fuel tank 230 extending downward to the level below the down tubes 114, 114 with the detachable under frame 143. The under frame 143 is mounted to the vehicle body frame 110 after the fuel tank 230 is inserted and attached into the space Sp1 from below the vehicle body frame 110.

Figure 7:
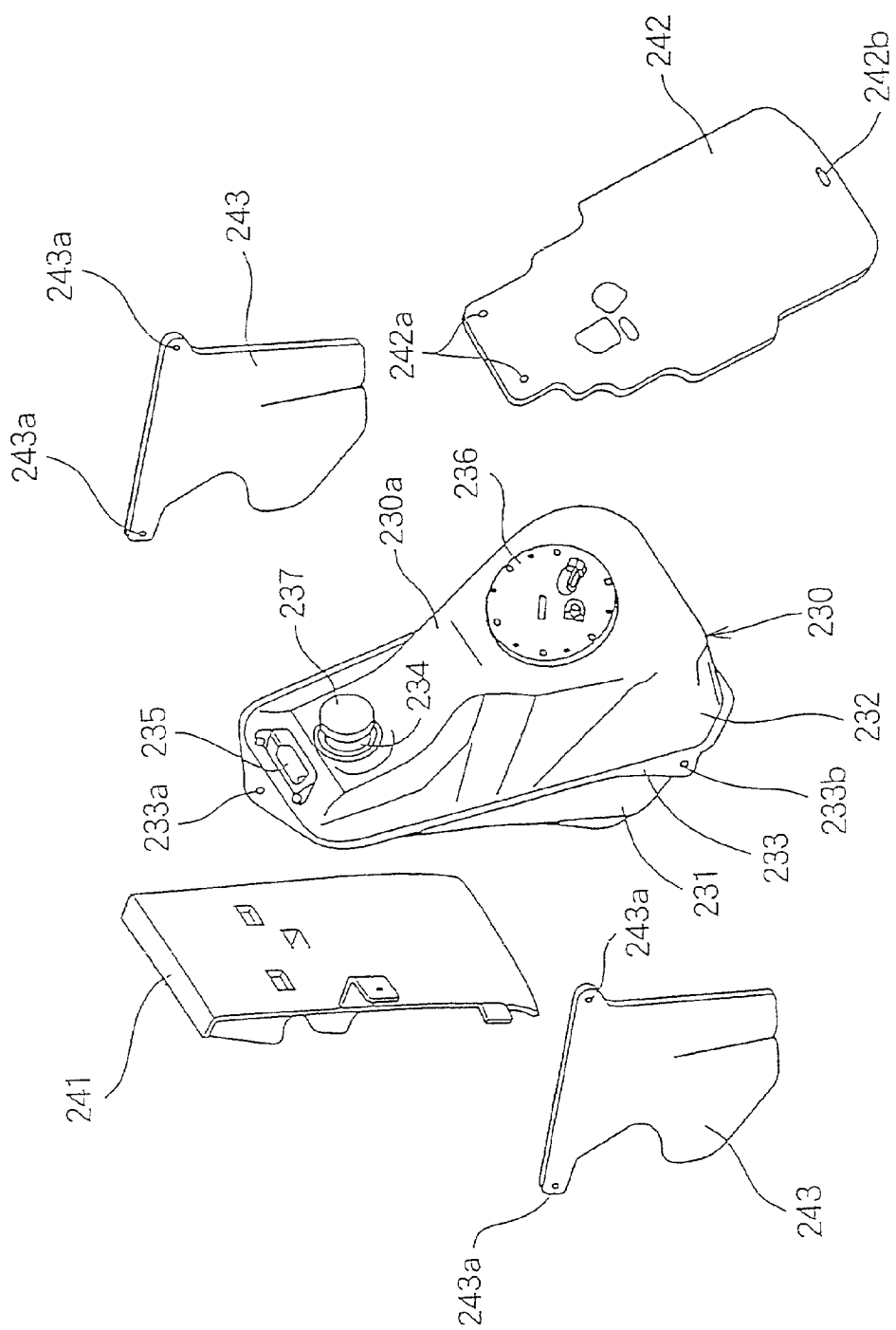
FIG. 7 is a perspective view of the fuel tank and the parts therearound of the motorcycle according to the present invention.

FIG. 7 is a perspective view of the fuel tank and the parts therearound of the motorcycle according to the present invention.

The fuel tank 230 is an integrated container formed by superimposing the lower half tank 231 to be located at the lower front half thereof and the upper half tank 232 to be located at the upper rear half thereof and joining at the flange 233 portion, and comprises a oil filler port 234 on an inclined upper surface 230a, a sub-tank 235 for a breather, and a fuel feed pump 236. More specifically, the sub-tank 235 for a breather, the oil filler port 234, and the fuel feed pump 236 are arranged on the upper portion of the fuel tank 230 in this order from the front.

The flange 233 includes a mounting hole 233a at the center of the upper portion and two mounting holes 233b each on the left and right lower portions (only one of the holes on the left is shown in the figure). The oil filler port 234 comprises a seal cap 237. The sub-tank 235 for a breather is a small container in communication with the inside of the fuel tank 230.

The present invention also includes a heat shielding plate for preventing thermal effect from the engine 211 (See FIG. 6) and the radiator 221 (See FIG. 6). The heating shield plate is divided into four members, represented by the reference numerals 241, 242, 243, 243. These divided heat shielding plates 241, 242, 243, 243 are arranged in the vicinity of the front surface, the rear surface, the left surface, and the right surface of the fuel tank 230, respectively.

Since the divided heat shielding plates 241, 242, 243, 343 are employed, the extent of thermal effect from the engine 211 and from the radiator 221 can be taken into consideration, and their size may be arbitrarily minimized depending on the configuration of each surface of the fuel tank 230. As a result, each heat shielding plate 241, 242, 243, 243 may be relatively small in size, and may be manufactured extremely easily. In addition, since the molding die may be small in size and thus it requires only a small amount of material, the manufacturing cost may be reduced as well.

The front shielding plate 241 covering the front surface of the fuel tank 230 is a resin sheet of a hard resin or the like, and is substantially square in front view. Since the front heat shielding plate 241 is formed of a resin sheet, it is very simple in shape, and may be manufactured at low cost.

The rear heat shielding plate 242 covering the rear surface of the fuel tank 230 is a rubber sheet in substantially square in shape, and comprises two hooking holes 242a, 242a at the upper left and right corners thereof, and one hooking hole 242b at the bottom thereof. The left and right heat shielding plates 243, 243 for covering the lower half portion of the left surface and the lower half portion of the right surface of the fuel tank 230 are formed of rubber sheets having two hooking holes 243a, 243a at the upper left and right corners thereof.

As described above, the rear heat shielding plate 242 and the left and right shielding plates 243, 243 are freely deformable and freely arranged depending on the space around the fuel tank 230 because they are formed of rubber sheets. It can also be arranged easily using a small space around the fuel tank 230 effectively. In addition, since the rear heat shielding plate 242 and the left and right heat shielding plates 243, 243 formed of sheets are employed, they may be very simple in shape and may be manufactured at lower cost.

Referring back to FIG. 6, the description will be continued. The front heat shielding plate 241 is a member which also serves as a cooling air guide of the radiator 221 by being disposed between the down tube 114 extending downward from the head pipe 111 and the fuel tank 230, and being detachably mounted on the front cross member 151. Therefore, the upper end of the front heat shielding plate 241 is curved toward the upper portion of the radiator 221, and the lower end of the front heat shielding plate 241 extends to the level below the radiator 221.

As described above, since the front heat shielding plate 241 is disposed between the down tube 114 and the fuel tank 230, the front heat shielding plate 241 can easily be mounted to the down tube 114. Therefore, the efficiency of mounting operation of the front heat shielding plate 241 is ensured.

The rear heat shielding plate 242 can be detachably mounted on the vehicle body frame 110 by hooking the upper portion on the headed pin 144, and hooking the lower portion on the hook 148. The left and right heat shielding plates 243, 243 (only left one is shown in the figure) can be detachably mounted on the vehicle body frame 110 by hooking the upper portion on the headed pin 144 . . . .

As is clear from the description given so far, since the divided heat shielding plates 241, 242, 243, 243 are employed, each heat shielding plate 241, 242, 243, 243 can be mounted freely on the vehicle body frame 110 after the fuel tank 230 is mounted on the vehicle body frame 110 (vehicle body), and thus the efficiency of mounting operation is ensured.

FIG. 6 also shows that the front lower cover 93 covers the front portion of the radiator 221, and the under cover 94 covers the lower portion of the radiator 221 and of the fuel tank 230. The front lower cover 93 extends to the front end of the under cover 94 and is provided with a plurality of cooling air ports 93a . . . for radiator on its front surface. The under cover 94 is provided with an exhaust air port 94a below the fan 224 for exhausting the exhaust air of the radiator 221 outward. The exhaust air port 94a is provided with a number of louvers (current plates) 94b . . . facing toward the upper rear.

FIG. 6 also shows that the vehicle body cover 20 is provided with a lid 330 for the oil filler port that is to be opened when filling fuel via the oil filler port 234 into the fuel tank 230, and a lid 360 for inspection that is to be opened when the ignition plug (not shown) of the engine 211 is inspected.

Figure 8:
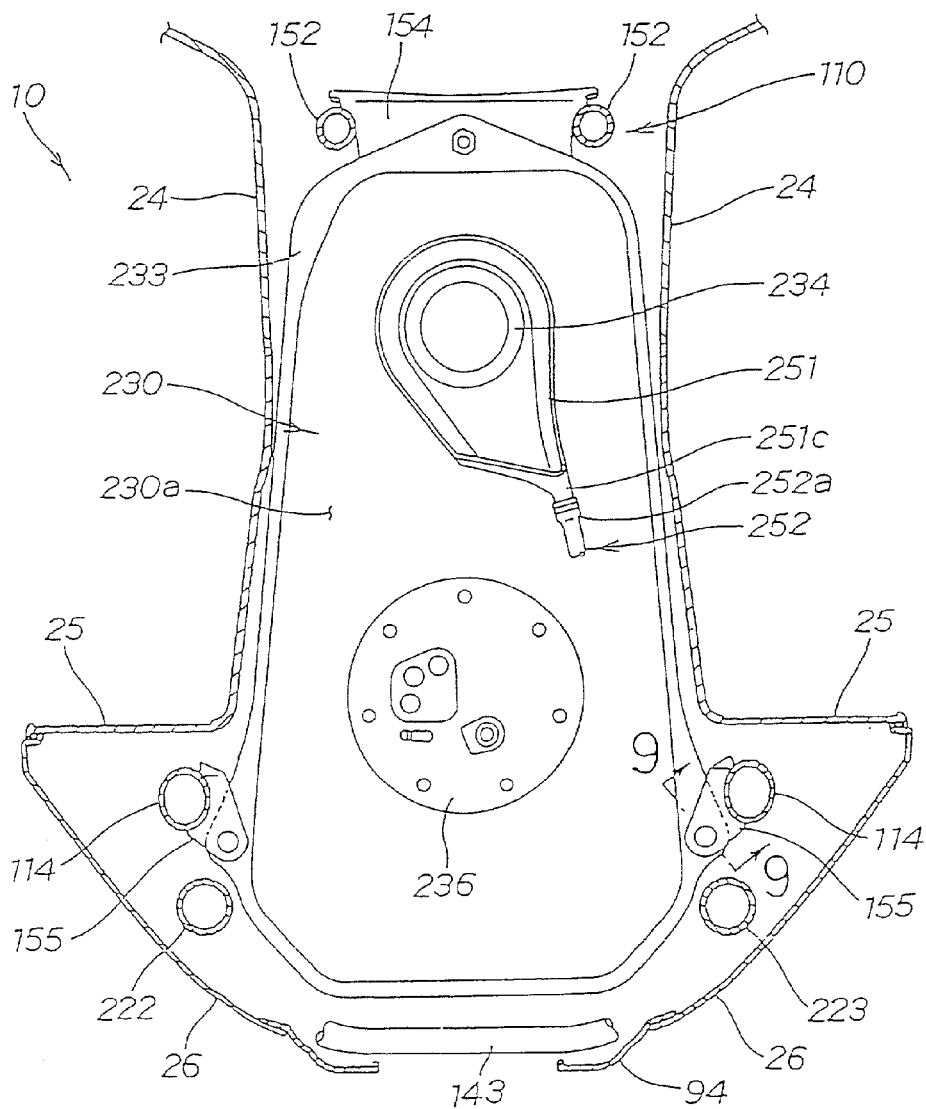
FIG. 8 is a view viewed in the direction shown by the arrow 8 in FIG. 6.

FIG. 8 shows a mounting structure of the fuel tank 230 on the vehicle body frame 110, viewing in the direction shown by the arrow 8 in FIG. 6.

The vehicle body frame 110 is formed by laying the upper bracket 154 between the left and right stays 152, 152, and mounting the lower brackets 155, 155 at the left and right down tubes 114, 114. The fuel tank 230 can be mounted detachably on the vehicle body frame 110 by securing the upper portion of the flange 233 of the fuel tank 230 to the upper bracket 154 with a bolt, and securing the lower portion of the flange 233 to the lower brackets 155, 155 with bolts. The upper portion of the flange 233 is tightly secured to the upper bracket 154 with bolt.

Figure 9:
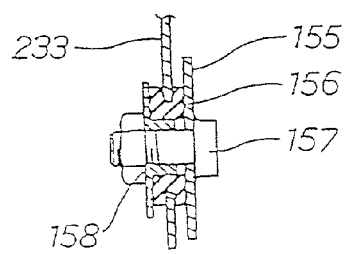
FIG. 9 is a cross sectional view taken along the line 9—9 in FIG. 8.

FIG. 9 is a cross sectional view taken along the line 9—9 in FIG. 8, and showing a state in which the lower portion of the flange 233 is rubber-mounted to the lower bracket 155 with a bolt and a screw nut 157 via a rubber bush 156. The reference numeral 158 designates a collar.

Figure 10:
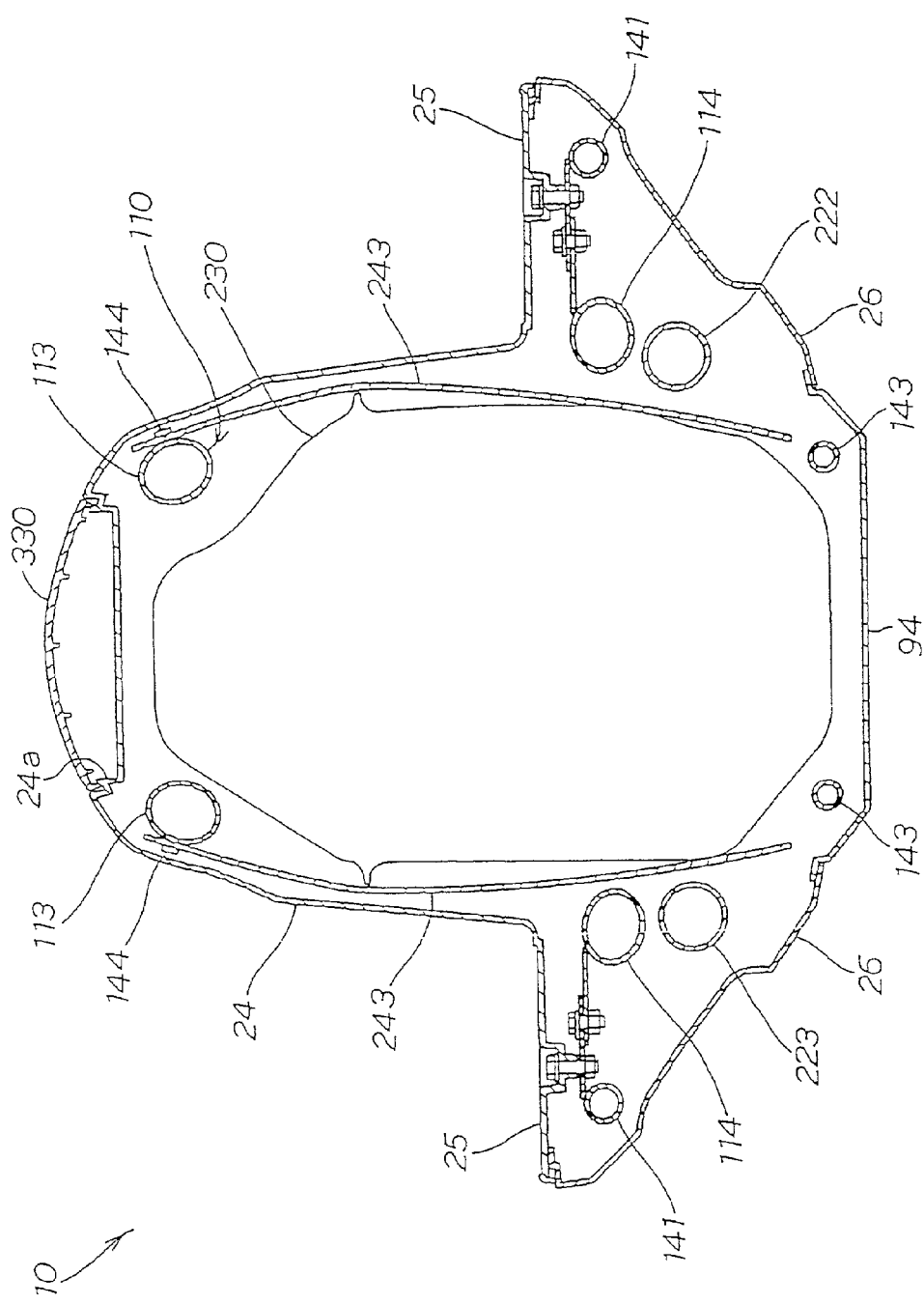
FIG. 10 is a front cross section of a motorcycle according to the present invention.

FIG. 10 is a front cross section of a motorcycle according to the present invention, showing a state in which (1) the vehicle body frame 110 and the fuel tank 230 is covered by the center cover 24, the left and right low-deck floors 25, 25, the left and right floor skirts 26, 26, and the under cover 94, and (2) the low-deck floors 25, 25 are secured to the left and right down tubes 114, 114 via the floor supporting stays 141, 141 with bolts.

As described above, the left and right heat shielding plates 243, 243 hooked on the headed pins 144 . . . extend downward alongside the fuel tank 230, and extend through the gaps between the side surfaces of the fuel tank 230 and the down tubes 114, 114. As is described thus far, since the upper portions of the left and right heat shielding plates 243, 243 must simply be hooked on the vehicle body frame 110, it can be mounted in a very simple manner.

Figure 11:
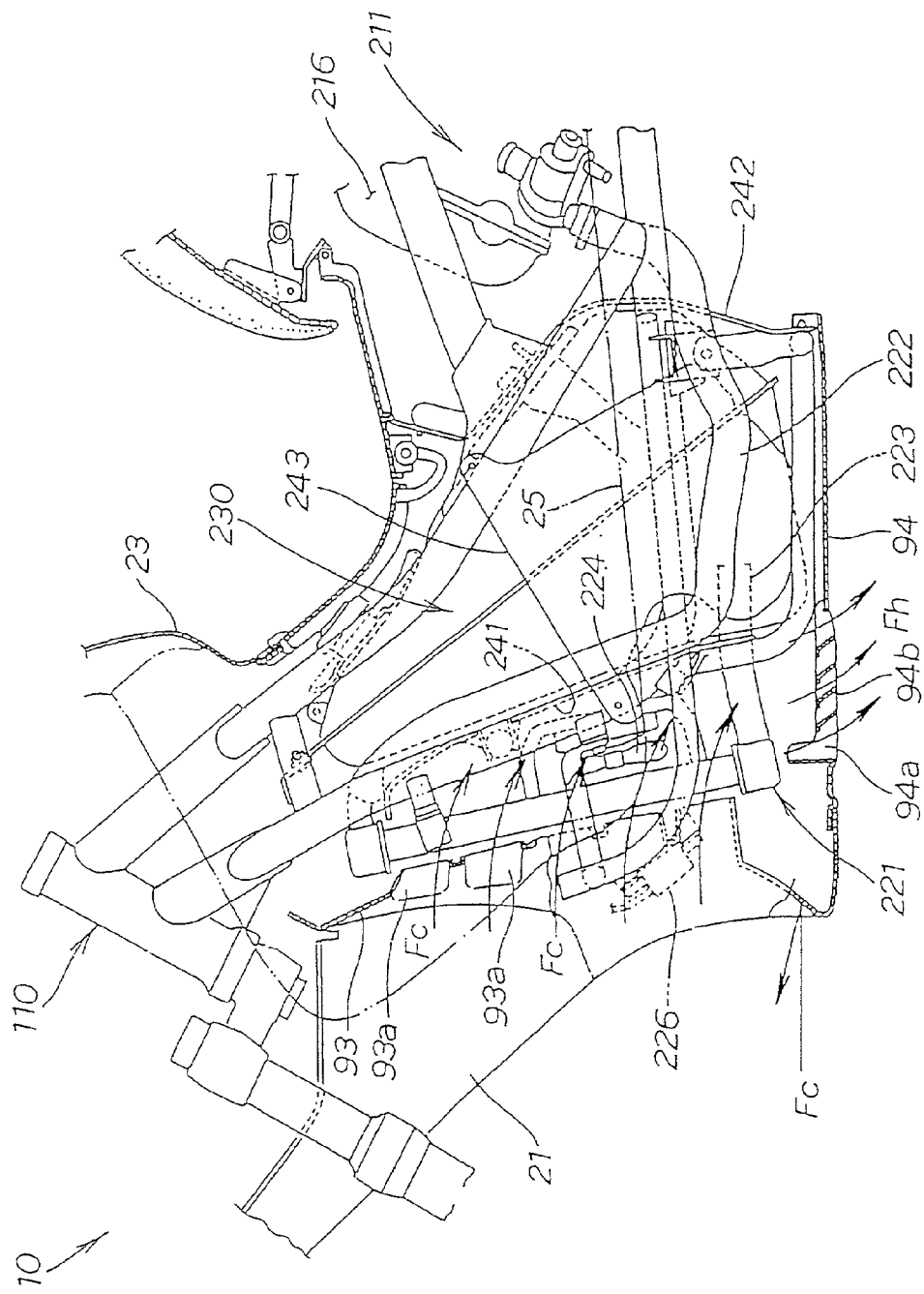
FIG. 11 is a drawing showing an action of the radiator and the parts therearound of the motorcycle according to the present invention.

FIG. 11 is a drawing showing an action of the radiator and the parts thereraround of the motorcycle according to the present invention. A fan 224 located behind the radiator 221 introduces air from the front of the radiator 221. Therefore, the outside air is introduced into the cooling air induction ports 93a . . . for the radiator as cooling air (including air blowing on the vehicle during travel) Fc, and flows through the cooling air passage into the radiator 221.

Hot air coming out from the radiator 221 (exhausted hot air) Fh is discharged through the fan 224, guided by the front heat shielding plate 241. Front heat shielding plate 241 also serves as a cooling air guide, to change the flow into downward direction, and discharged from the air discharge port 94a of the under cover 94 toward the outside.

Since the direction of hot air Fh coming out from the radiator 221 is changed by the front heat shielding plate 241, the effect of hot air Fh on the engine 211 or the fuel tank 230 located behind the radiator 221 can be prevented. Since the front heat shielding plate 241 also serves as a cooling air guide, provision of a separate cooling air guide is not necessary.

Figure 12:
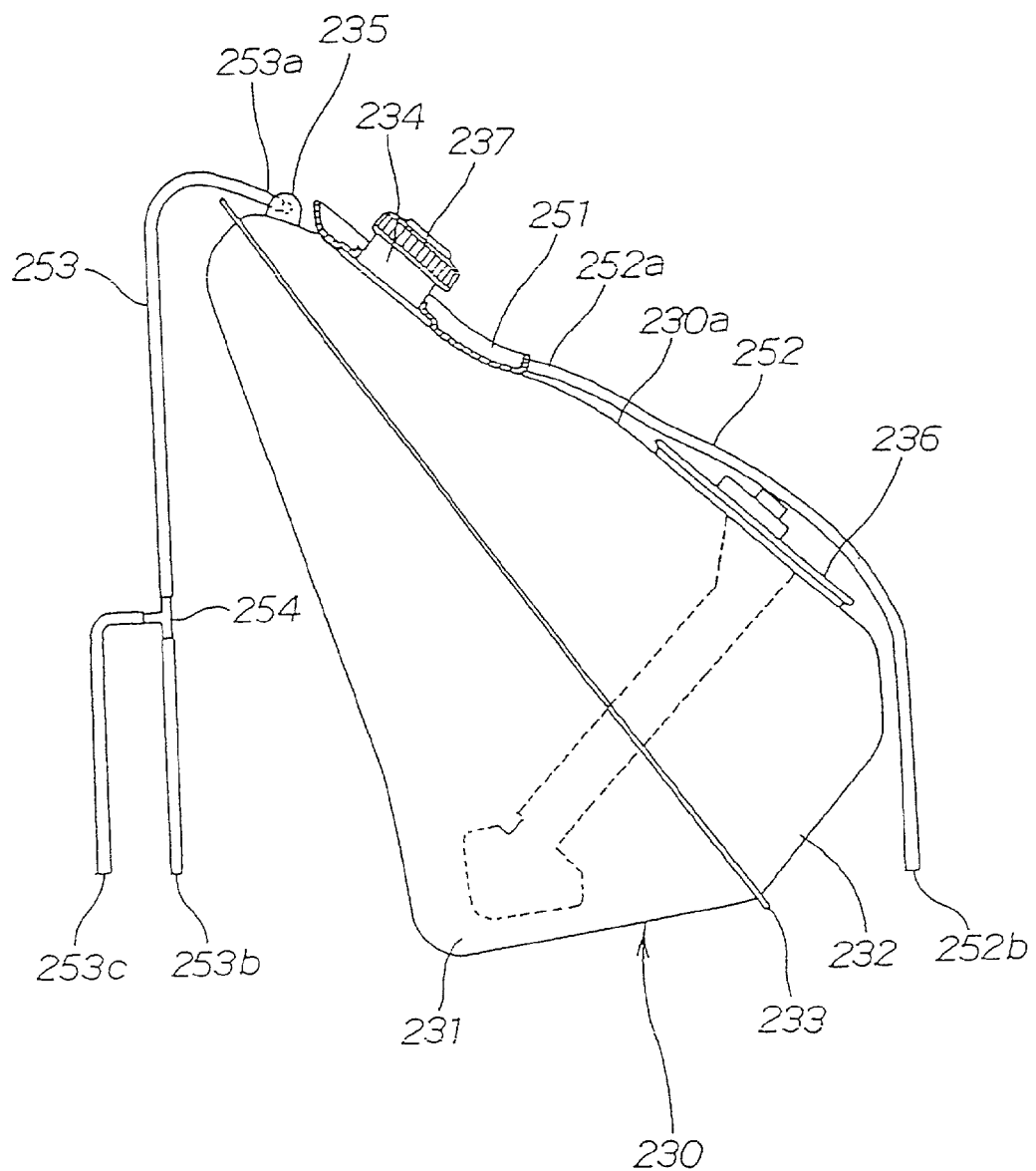
FIG. 12 is a diagrammatic sketch of the fuel tank of the motorcycle according to the present invention.

FIG. 12 is a diagrammatic sketch of the fuel tank of the motorcycle according to the present invention, and shows the fuel tank 230 provided with a tray 251 surrounding the oil filler port 234, one end 252a of the fuel discharge hose (drain hose) 252 connected to the tray 251, and the other end 252b of the fuel discharge hose 252 opened in the air. An end 253a of the breather hose 253 is connected to the sub-tank 235 for a breather, and the other end of the breather hose 253 are bifurcated 253b, 253c. The reference numeral 254 designates a T-joint for bifurcating the other end of the breather hose 253.

Figure 13:
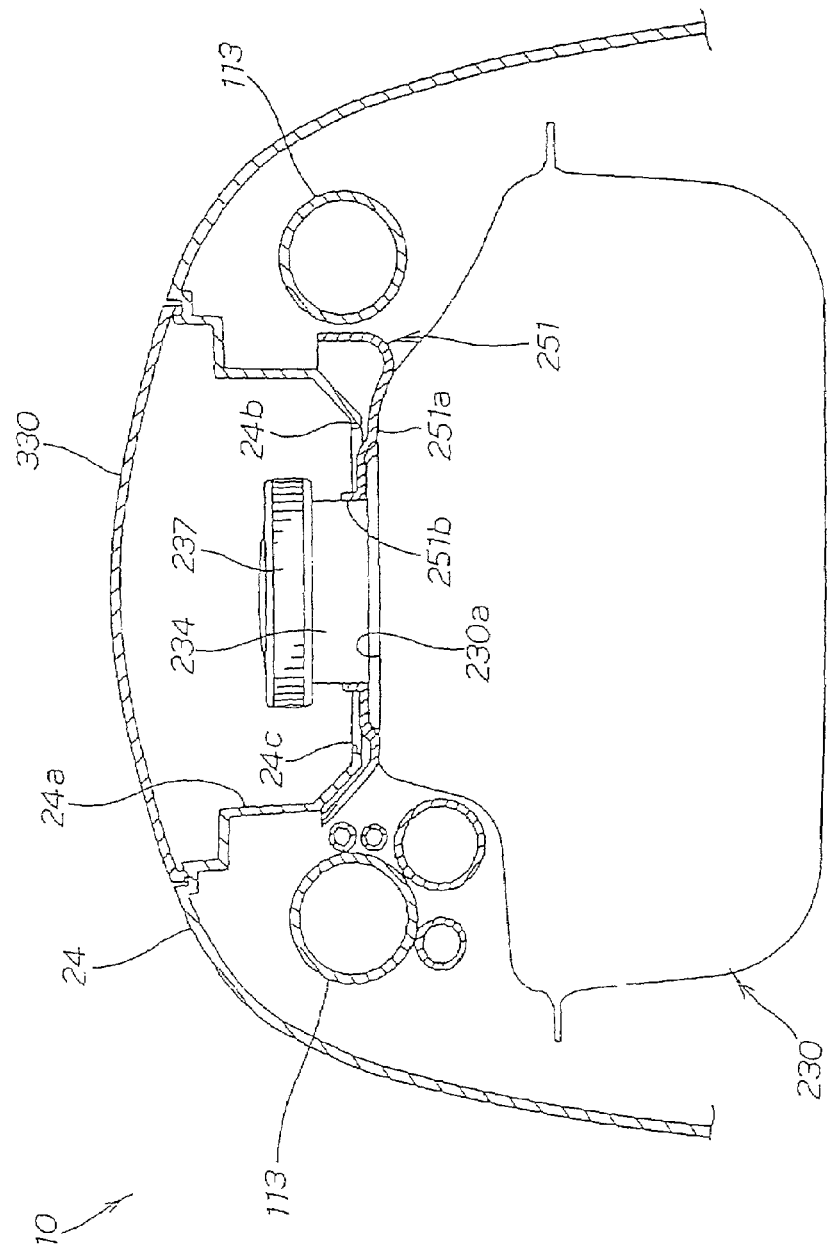
FIG. 13 is a sectional back view showing the oil filler port of the fuel tank and the parts therearound of the motorcycle according to the present invention.

FIG. 13 is a sectional back view showing the oil filler port of the fuel tank and the parts therearound of the motorcycle according to the present invention. The tray 251 is a fuel pan having a flat bottom 251a and a cylindrical portion 251b passing vertically therethrough formed in a single piece. The tray 251 can be mounted simply by inserting the cylindrical portion 251b into the oil filler port 234 and having the upper and lower surfaces of the bottom 251a captured between the bottom 24b of the recess 24a provided at the oil filling section of the center cover 24 and the upper surface 230a of the fuel tank 230. Therefore, the members such as bolts or the like for mounting the tray 251 is not necessary, and thus it may be mounted easily. The reference numeral and sign 24c designate a through hole for the oil filler port.

Figure 14:
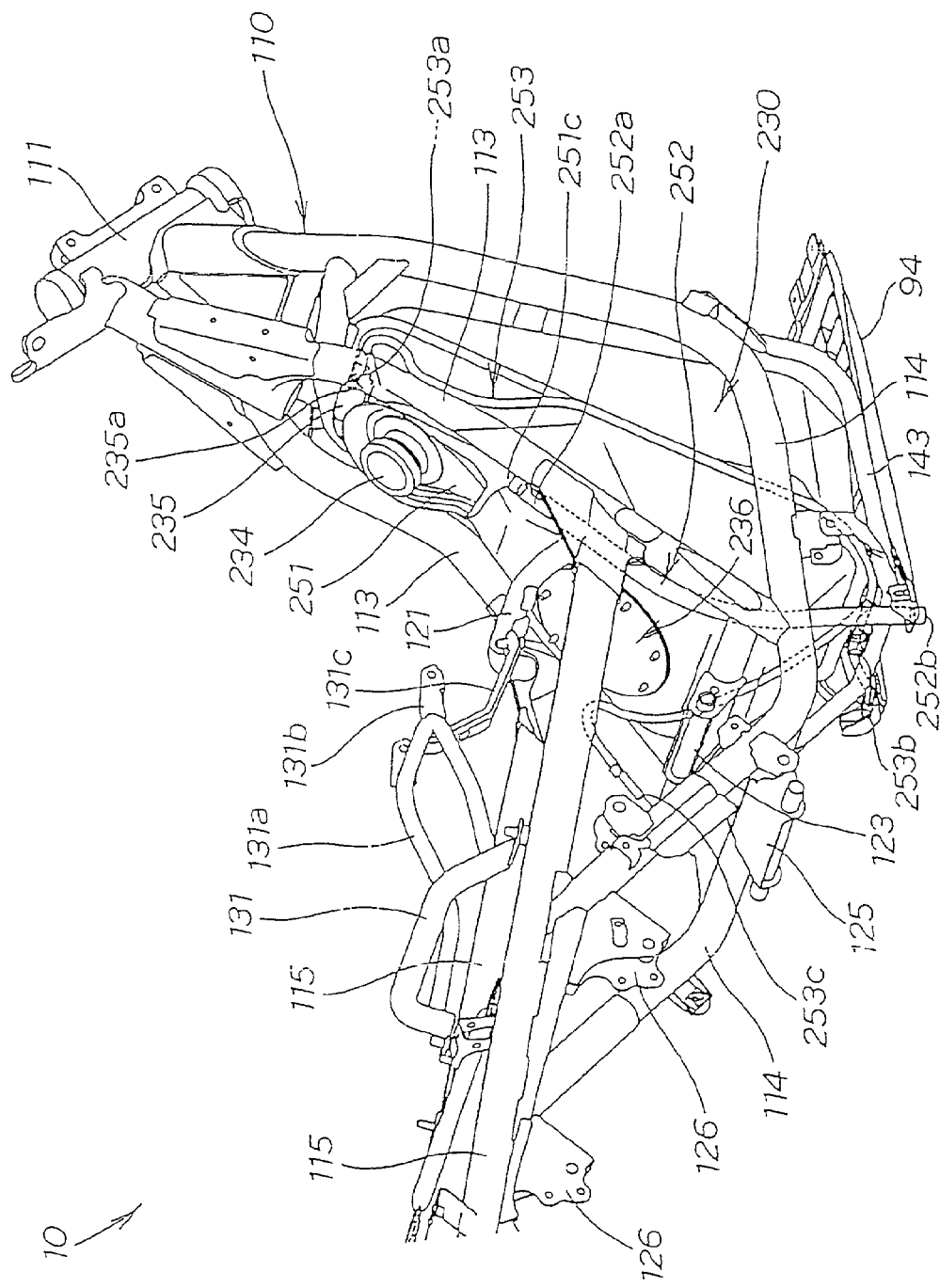
FIG. 14 is an outline view showing the right side of the vehicle body frame and the fuel tank of the motorcycle according to the present invention.

FIG. 14 is an outline view showing the right side of the vehicle body frame and the fuel tank of the motorcycle according to the present invention. The tray 251 comprises a discharge port 251c extending downward toward the rear. One end 252a of the fuel discharge hose 252 is connected to the discharge port 251c, and the fuel discharge hose 252 is extended downward along the right upper frame 113 to the right end of the rear portion of the under cover 94, and the other end 252b is directed downward. Fuel spilt around the oil filler port 234 during fueling into the fuel tank 230 may be collected on the tray 251 and discharged via the fuel discharge hose 252 to the outside. Therefore, spilt fuel will never be attached the exterior surface of the fuel tank.

The sub-tank 235 for a breather comprises a breather port 235a extending along the right side. The breather hose 253 is connected to the breather port 235a at one end 253a thereof and is extended downward toward the rear along the right side of the fuel tank 230. That is, when viewing the fuel tank 230 from the front, the breather hose 253 passes between the upper frame 113 and the down tube 114, and extends along the fuel tank 230 to the right end of the rear portion of the under cover 94, and then bifurcates. One end of the bifurcated branch 253b extends to the left end of the rear portion of the under cover 94 and is opened in the air, and the other end of the bifurcated branch 253c extends upward once along the rear surface of the fuel tank 230, and then rearward along the left upper frame 113, and is opened into the air.

In the aforementioned embodiment of the present invention, the ignition coil 226 shown in FIG. 6 must simply be arranged on the opposite side of the return pipe 222 with respect to the center of the vehicle width. For example, when the return pipe 222 is laid on the right side with respect to the center of the vehicle width, the ignition coil 226 is to be arranged on the left side.

Figure 15:
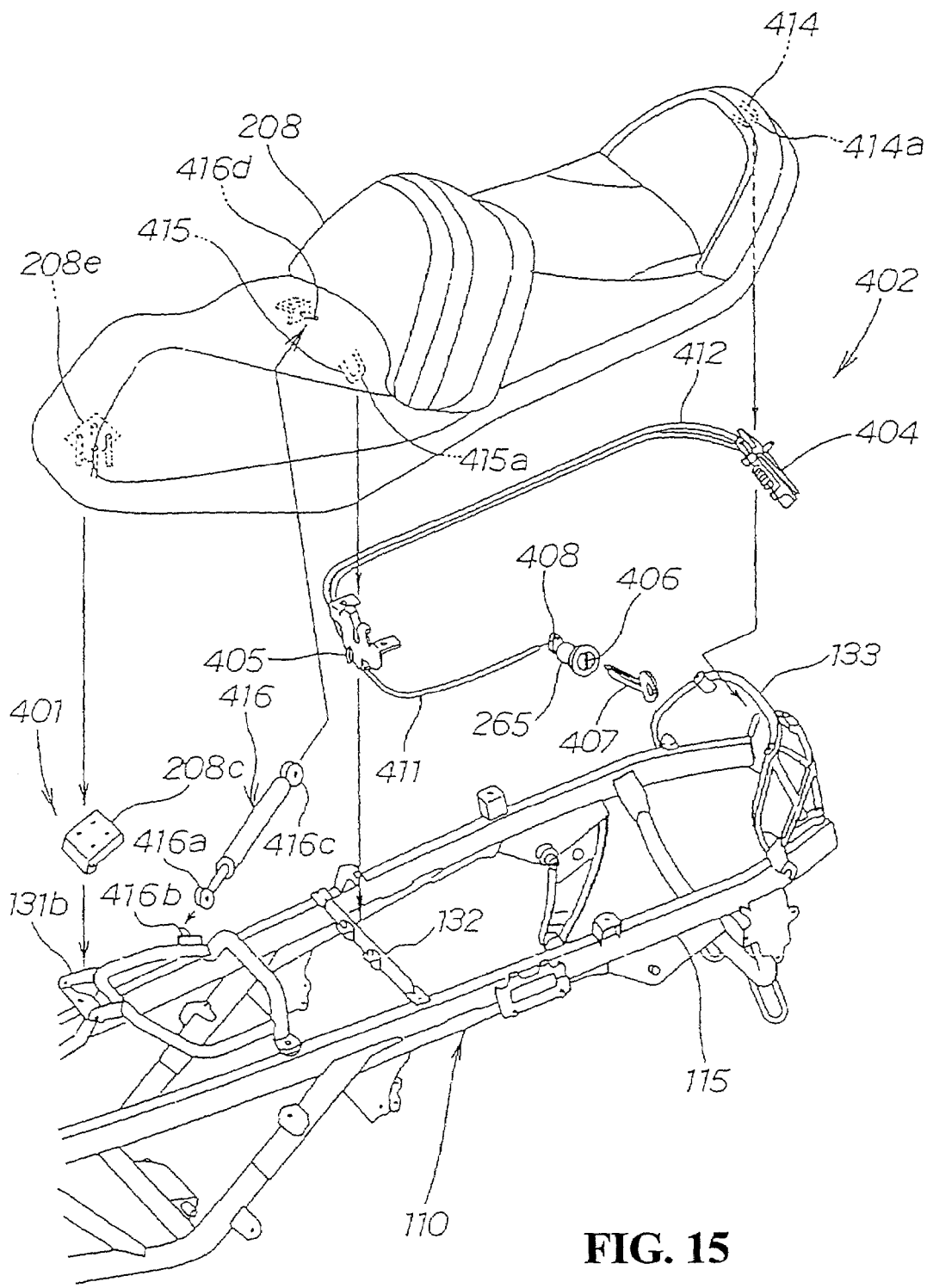
FIG. 15 is a perspective view showing the seat attachment structure of the motorcycle according to the present invention.

FIG. 15 is a perspective view showing the seat attachment structure of the motorcycle according to the present invention, showing that the seat 208 is attached via a seat hinge 401 as a hinge to the vehicle body frame 110 so as to be capable of a swinging motion, and the seat 208 is attached to the vehicle body frame 110 via a seat locking mechanism 402 so as to be capable of being locked. The seat hinge 401 comprises a seat hinge supporting portion 113b, the movable portion of the seat hinge 208c attached to the seat bottom plate 208d (See FIG. 3), and a hinge shaft, not shown, for connecting both of them so as to be capable of a swinging motion.

The seat locking mechanism 402 comprises a main locking mechanism 404 to be mounted on the rearmost rear cross member 133, a sub-locking mechanism 405 to be mounted on the middle rear cross member 132, and a seat lock 265 to be mounted on the vehicle body frame 110 via a bracket, not shown. The seat locking mechanism 402 also includes a key 407 for inserting the keyhole 406 on the seat lock 265 to unlock the main and sub-locking mechanism 404, 405, a first cable 411 extending from the arm portion 408 of the seat lock 265 through the course under the sub-locking mechanism 405 to the main locking mechanism 404, and a second cable 412 as a connecting member extending from the main locking mechanism 404 to the sub-locking mechanism 405. The seat lock 265 is constructed in such a manner that when the key 407 inserted thereto is turned, the internal shaft, not shown, is turned, and thus the arm portion 408 integrally attached to the shaft is also turned.

The reference numeral and sign 208e designate here a hinge attaching position provided on the seat bottom plate 208d for mounting the movable portion of the seat hinge 208c. The reference numerals 414, 415 designate angular U-shaped first and second seat hooks provided on the seat bottom plate 208d of the seat 208 for engaging the main locking mechanism 404 and the sub-locking mechanism 405 respectively. The reference numeral 416 designates a damper comprising a piston inserted into the cylinder to define an oil chamber in the cylinder, a coil spring stored in the oil chamber, oil enclosed in the oil chamber, and a piston rod attached to the piston so as to generate an upward force corresponding to the net weight of the seat 208 to aid the operating force when opening the seat 208. The tip 416a of the piston rod is attached to the vehicle body frame 110 via the mounting bracket 416 on the vehicle body, and the end portion 416c of the cylinder is attached to the seat 208 via the mounting bracket 416d on the seat.

Figure 16:
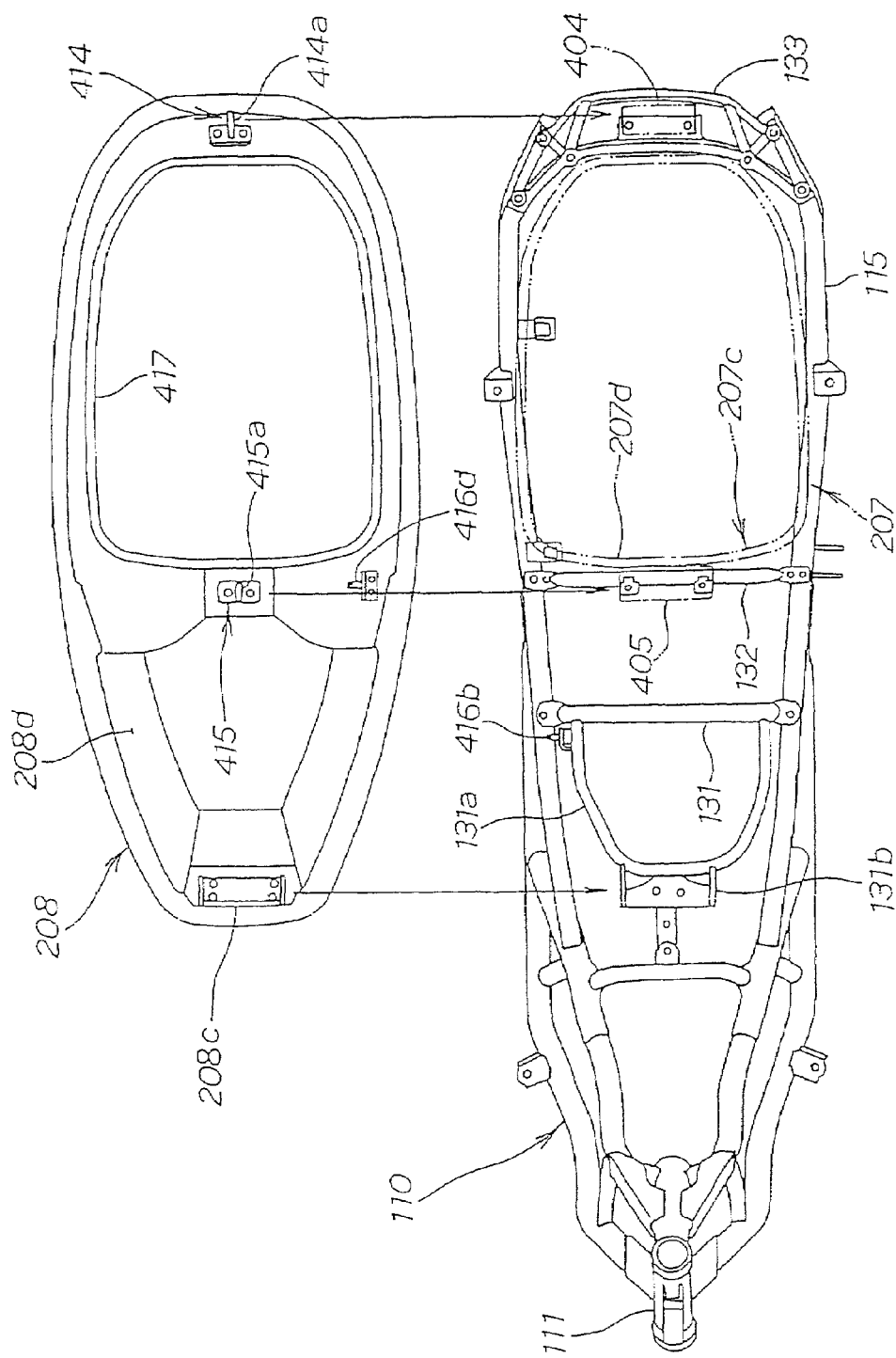
FIG. 16 is an explanatory drawing showing the seat attachment structure of the motorcycle according to the present invention.

FIG. 16 is an explanatory drawing showing the seat attachment structure of the motorcycle according to the present invention, including a plan view of the vehicle body frame 110 and the bottom view of the seat 208. It shows a state in which the movable portion 208c of the hinge is attached at the front end of the seat bottom plate 208d, the first seat hook 414 to be engaged with the main locking mechanism 404 is attached at the rear end of the seat bottom plate 208d, and the second seat hook 415 to be engaged with the sub-locking mechanism 405 is attached almost at the center of the seat bottom plate 208d.

The mounting bracket 416b for mounting the damper 416 (See FIG. 15) on the vehicle body is attached on the U-shaped stay 131a, and the bracket 416d to be mounted on the seat is attached on the seat bottom plate 208d.

The reference numerals and signs 414a, 415a designate straight portions provided on the first and the second seat hooks 414, 415 for being engaged with the main locking mechanism 404 and the sub-locking mechanism 405. The numeral 417 designates an annular seal rubber attached on the seat bottom plate 208d for preventing rainwater, dust, and grime from entering into the storage box 207 by being pressed against the edge 207d of the opening 207c of the storage box 207 when the seat 208 is closed. The annular seal rubber 417 also prevents rattling of the seat 208 with respect to the storage box 207.

Figure 17:
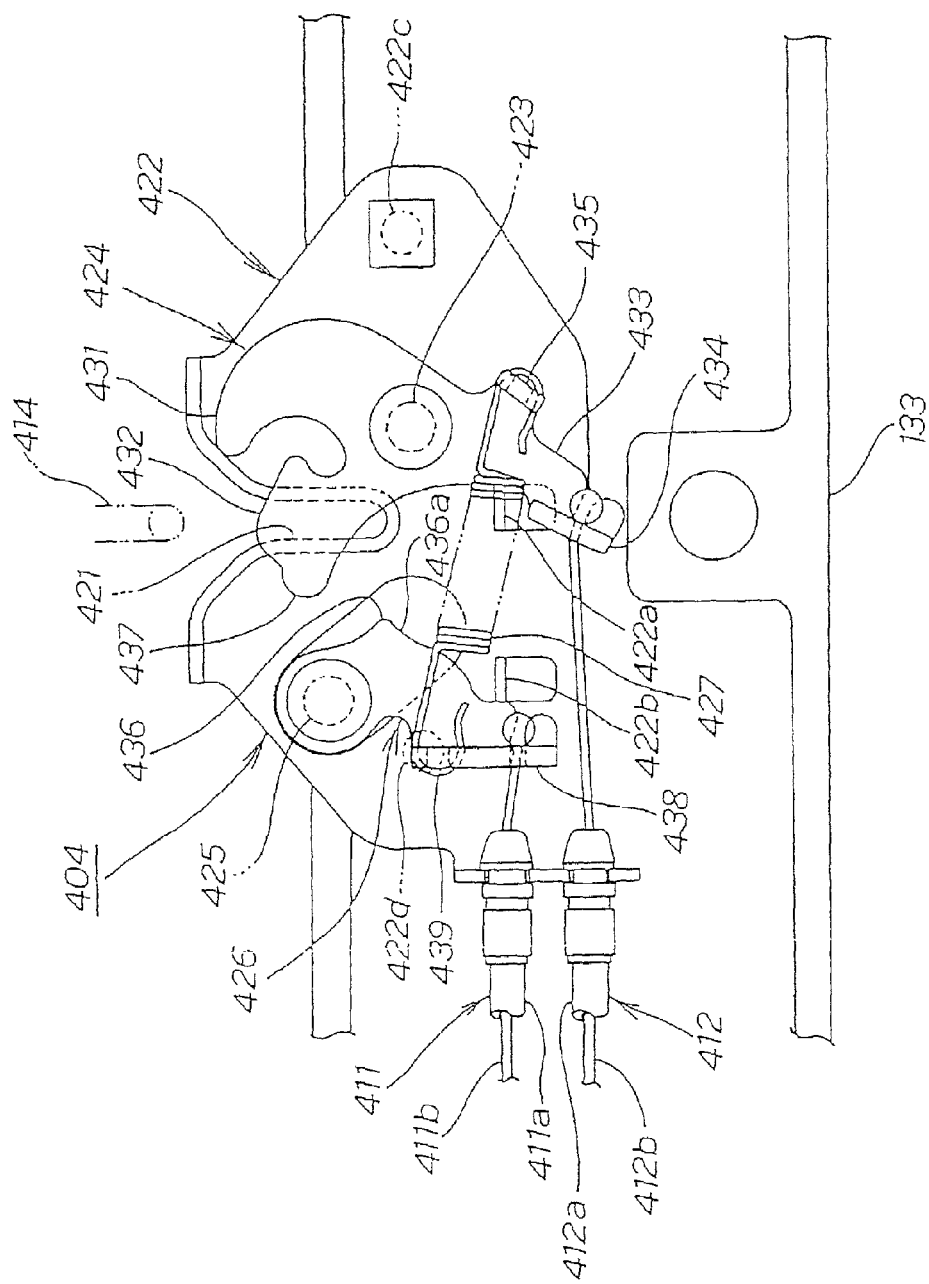
FIG. 17 is a front view of the main locking mechanism for the seat of the motorcycle according to the present invention.

FIG. 17 is a front view of the main locking mechanism for the seat of the motorcycle according to the present invention. The main locking mechanism 404 comprises a housing 422 formed with a U-shaped groove 421, a locking claw 424 rotatably mounted on the housing 422 via a pin 423, a stopper member 426 rotatably mounted on the housing 422 via a pin 425 for holding the locking claw 424 at the locking position, and a tension coil spring 427 laid between the locking claw 424 and the stopper member 426. The tension coil spring 427 pulls the locking claw 424 to the unlocking direction and pulls the stopper member 426 counterclockwise. The reference numerals and signs 422a, 422b are uprising portions formed by rising parts of the housing 422 for limiting rotation of the locking claw 424 and of the stopper member 426 respectively.

The locking claw 424 is a member formed into a shape of reversed F with the upper claw 431 and the lower claw 432, and comprises a second cable attaching point 434 for attaching one end of the second cable 412 and a spring attaching point 435 for attaching one end of the tension coil spring 427 on the lower arm portion 433.

The stopper member 426 comprises a projected portion 436, a inclined portion 436a formed on the projected portion 436 for being abutted by the lower projection 437 formed on the lower claw 432 of the locking claw 424, a first cable attaching point 438 for securing the tip of the first cable 411, and a spring attaching point 439 for securing the other end of the tension coil spring 427. The locking claw 424 is rotated toward the locking position by pushing the lower claw 432 of the locking claw 424 downward by the first seat hook 414 attached on the seat 208 (See FIG. 16).

The main locking mechanism 404 is disposed between the storage box 207 (See FIG. 16) and the rearmost rear cross member 133 by being mounted on the rearmost rear cross member 133 with bolts 422c, 422d and screw nuts (not shown).

The first cable 411 comprises an outer tube 411a and an inner wire 411b movably inserted into the outer tube 411a. One end of the outer tube 411a is attached to the housing 422, and other end thereof is attached to the bracket (not shown) for the seat lock 265 (see FIG. 15). One end of the inner wire 411b is attached to the first cable attaching point 438 of the stopper member 426, and the other end thereof is attached to the arm portion 408 (see FIG. 15) of the seat lock 265.

The second cable 412 comprises an outer tube 412a and the inner wire 412b movably inserted into the outer tube 412a. One end of the outer tube 412a is attached to the housing 422, and the other end thereof is attached to the housing 433 (described later, see FIG. 18) of the sub-locking mechanism 405 (see FIG. 15), and one end of the inner wire 412b is attached to the second cable attaching point 434 of the locking claw 424 and the other end thereof is attached to the second cable attaching point 456 (described later, see FIG. 18) of the sub-locking mechanism 405.

Figure 18:
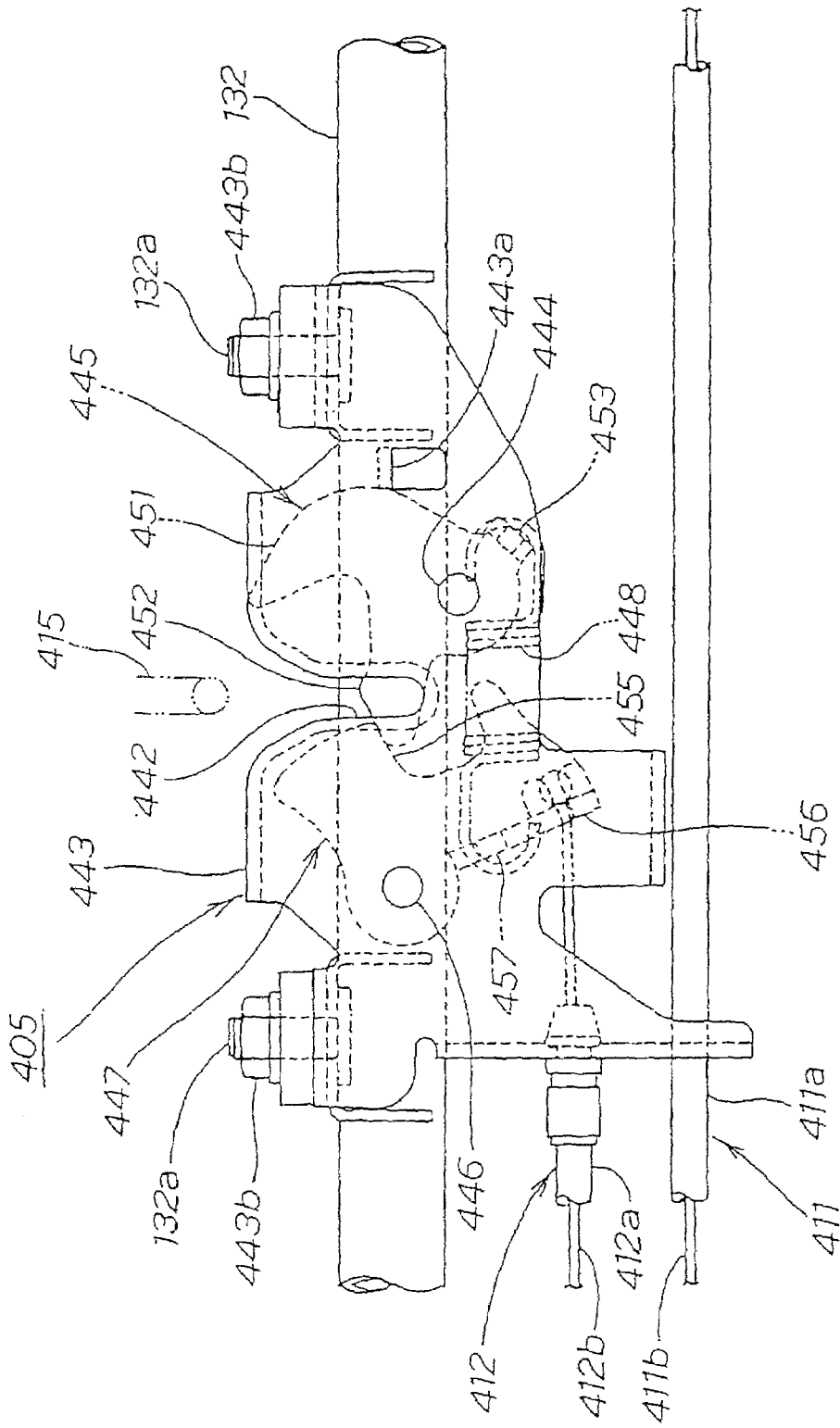
FIG. 18 is a front view of the sub-locking mechanism for the seat of the motorcycle according to the present invention.

FIG. 18 is a front view of the sub-locking mechanism for the seat of the motorcycle according to the present invention. The sub locking mechanism 405 comprises a housing 443 formed with a U-shaped groove 442, a locking claw 445 rotatably mounted on the housing 443 via a pin 444, a driving member 447 rotatably mounted on the housing 443 via a pin 446 for rotating the locking claw 445, and a tension coil spring 448 laid between the locking claw 445 and the driving member 447. The tension coil spring 148 pulls the locking claw 445 in the unlocking direction and pulls the driving member 447 counterclockwise. The reference numeral and sign 433a designate an uprising portion formed by raising toward the far side of the figure for limiting clockwise rotation of the locking claw 445. The numerals and signs 443b, 443b designate screw nuts for being screwed on the bolt 132a, 132a provided on the middle rear cross member 132 for mounting the sub-locking mechanism 405 to the middle rear cross member 132.

The locking claw 445 is a member comprising an upper claw 451 and a lower claw 452 formed into an elbow-shape, and is provided with a spring attachment 453 for attaching one end of the tension coil spring 448 at the lower portion thereof. The driving member 447 comprises a jaw 455 to be abutted against the lower claw 452 of the locking claw 445, and a second cable attaching point 456 for attaching the other end of the second cable 412, and a spring attachment 457 for attaching the other end of the tension coil spring 448.

When the lower portion of the driving member 447 is pulled by the second cable 412, the jaw 455 of the driving member 447 presses the lower claw 452 of the locking claw 445 downward, and thus the locking claw 445 rotates toward the locking position (counterclockwise).

A plurality of aforementioned sub-locking mechanisms 405 may be provided. In such a case, the driving members 447 of the respective sub-locking mechanisms 405 are connected by cables, or the locking claw 424 (see FIG. 17) of the main locking mechanism 404 (see FIG. 17) and the driving members 447 of the respective sub-locking mechanisms 405 are connected by cables respectively.

Next, the operation of the seat attachment structure described thus far will be outlined.

FIGS. 19(a)–(c) are first explanatory drawings illustrating the operation of the seat attachment structure of the motorcycle according to the present invention, in which FIG. 19(a) is a side view of the seat 208, FIG. 19(b) is a diagrammatic sketch illustrating the balance of moment acting on the seat according to this embodiment, and FIG. 19(c) is a diagrammatic sketch illustrating the balance of moment of the comparative example.

In FIG. 19(a), an axis of opening and closing movement of the seat hinge 401 is represented by 401a, the horizontal distance from the shaft 401a to the second seat hook 415 of the sub-locking mechanism is represented by L1, and the horizontal distance from the shaft 401a to the first seat hook 414 of the main locking mechanism is represented by L3. The center point in the horizontal length of the seal rubber 417 abutted against the edge of the opening of the storage box 207 is represented by 460, and the horizontal distance between the center point 460 and the aforementioned shaft 401a is represented by L2.

In FIGS. 19(b) and (c), each of the shaft 401a, the first and second seat hooks 414, 415, and the center point 460 of seal rubber 417 is illustrated by a point for the sake of convenience. In FIG. 19(b), the main locking mechanism 404 and the sub-locking mechanism 405 are shown in rectangular, and a downward pressing force required for locking the main locking mechanism 404 and the sub-locking mechanism 405 by pressing the rear end portion of the seat above the main locking mechanism 404 downward is represented by F1, a reaction force of the locking claw exerted on the first seat hook 414 upward by the locking claw of the main locking mechanism 404 when locked is represented by RN, and a reaction force of seal rubber 417 bent by being abutted against the edge of the storage box 207 is represented by RR. Though the reaction force of rubber RR is a distributed load, it is considered to be a load acting on the center point 460 for the purpose of illustration. Though the seat is exerted with a downward force by its own weight and with an upward force by the damper, its own weight is almost cancelled by the force exerted by the damper, and thus the forces exerted by its own weight and by the damper are not described here. This is also applied to the comparative example described below.

The comparative example FIG. 19(c) is an example of the seat lock mechanism in which the main locking mechanism 501 is disposed below the central portion of the seat 208, and the sub-locking mechanism 502 is disposed below the rear end portion of the seat 208, so that when the main locking mechanism 501 at the center is locked, the sub-locking mechanism 502 at the rear end is simultaneously locked. The main locking mechanism 501 and the sub-locking mechanism 502 are shown in rectangular.

As such, when the seat locking mechanism is locked by pressing the center portion of the seat above the main locking mechanism 501 downward, a downward pressing force required for locking is F2. At the same time, the reaction force of the locking claw of the main locking mechanism 501 at the moment of locking is RN, which is the same as that of the reaction force of rubber is RR (See FIG. 19(b).

The balance of moment about the seat hinge shaft 401a in this embodiment shown in the aforementioned FIG. 19(b), and the balance of moment about the seat hinge shaft in the comparative example in FIG. 19(c) will be shown the Equations in lines 1–7 below.

| Line | Description | Equation |
|---|---|---|
| 1. | Present Invention: Balance of moment about the seat shaft | $F1 \times L3 = RR \times L2 + RN \times L3$ |
| 2. | Comparative Example: Balance of moment about the seat shaft | $F2 \times L1 = RR \times L2 + RN \times L1$ |
| 3. | From equation in line 1 | $(F1 - RN) \times L3 = RR \times L2$ |
| 4. | From equation in line 2 | $(F2 - RN) \times L1 = RR \times L2$ |
| 5. | From equations in lines 3 and 4 | $(F1 - RN) \times L3 = (F2 - RN) \times L1$ |
| 6. | Divide both sides of the equation in line 5 by L3 | $(F1 - RN) = L1/L3 \times (F2 - RN)$ |
| 7. | Since $L3 < L1$, $F1 - RN) < (F2 - RN)$. Therefore: | $F1 < F2$ |

Figure 20B:
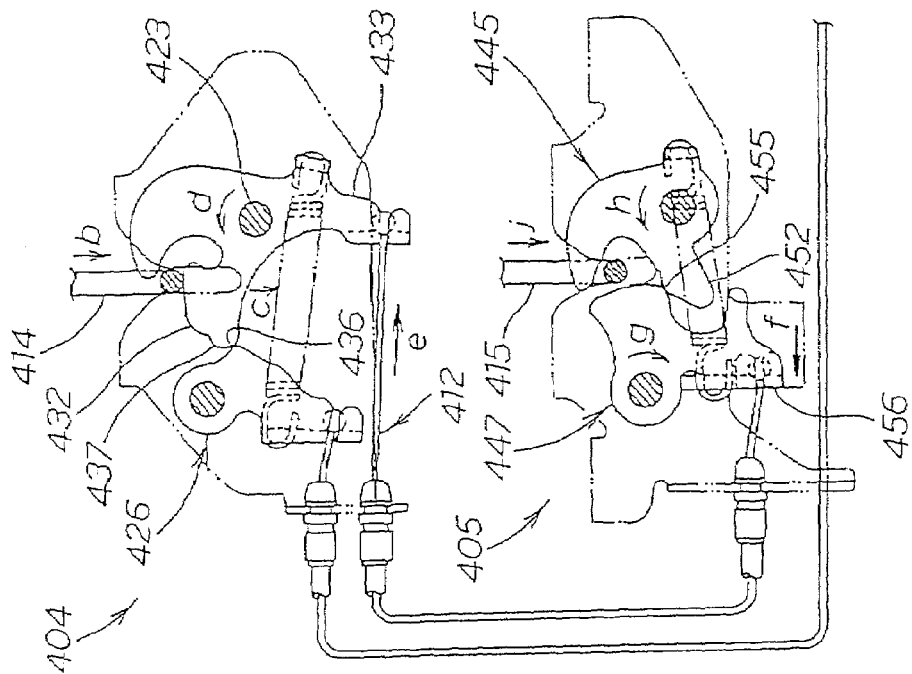
FIGS. 20(a) and (b) are second explanatory drawings illustrating the operation of the seat attachment structure of the motorcycle according to the present invention.
Figure 20A:
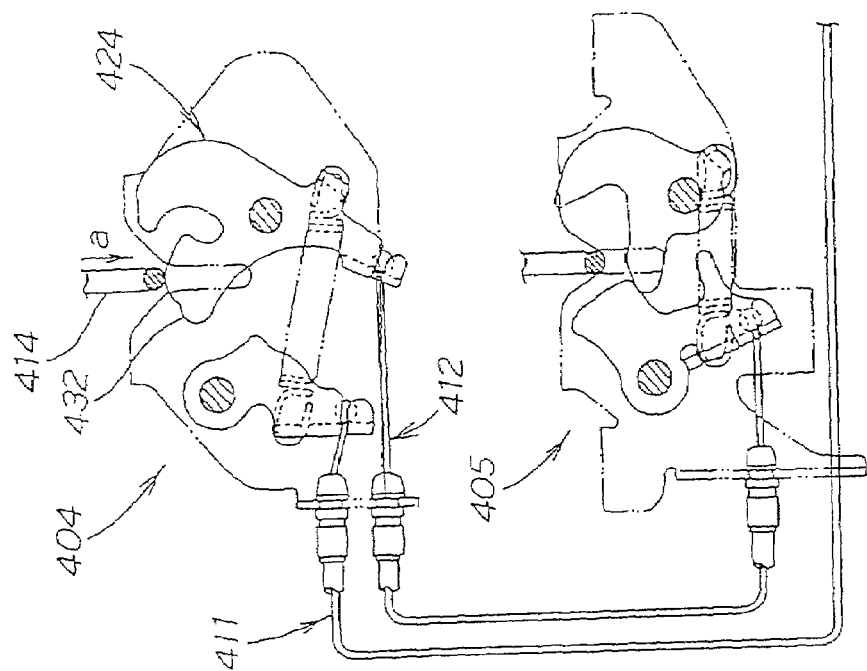

From the equation in line 7 above, the downward pressing force of the seat F1 in this embodiment is smaller than the downward pressing force of the seat F2 in the comparative example. The operating force for locking the seat may be reduced according to the present invention. FIGS. 20(a) and (b) are second explanatory drawings illustrating the operation of the seat attachment structure of the motorcycle according to the present invention.

In FIG. 20(a), when the seat is pressed downward by hand in order to close the seat, the first seat hook 414 attached at the lower portion of the seat moves downward as illustrated by the arrow a and abuts against the lower claw 432 of the locking claw 424 of the main locking mechanism 404. Then, as shown in (b), when the first seat hook 414 moves further downward as illustrated by the arrow b, the downward movement of the lower claw 432 of the main locking mechanism 404 as illustrated by the arrow c makes the locking claw 424 rotate about the pin 423 as illustrated by the arrow d, and the lower projection 437 of the locking claw 424 abuts against the projected portion 436 of the stopper member 426. Accordingly, the lower arm portion 433 of the locking claw 424 pulls the second cable 412 as illustrated by the arrow e.

When the second cable 412 is pulled, the second cable attaching point 456 of the driving member 447 of the sub-locking mechanism 405 is pulled in the direction illustrated by the arrow f and the driving member 447 rotates as illustrated by the arrow g. Then the jaw 455 of the driving member 447 presses the lower claw 452 of the locking claw 445 downward, thereby rotating the locking claw 445 in the direction illustrated by the arrow h. At this moment, the second seat hook 415 provided at the lower portion of the seat moves downward in almost the same manner as the first seat hook 414 as illustrated by the arrow j.

Figure 21B:
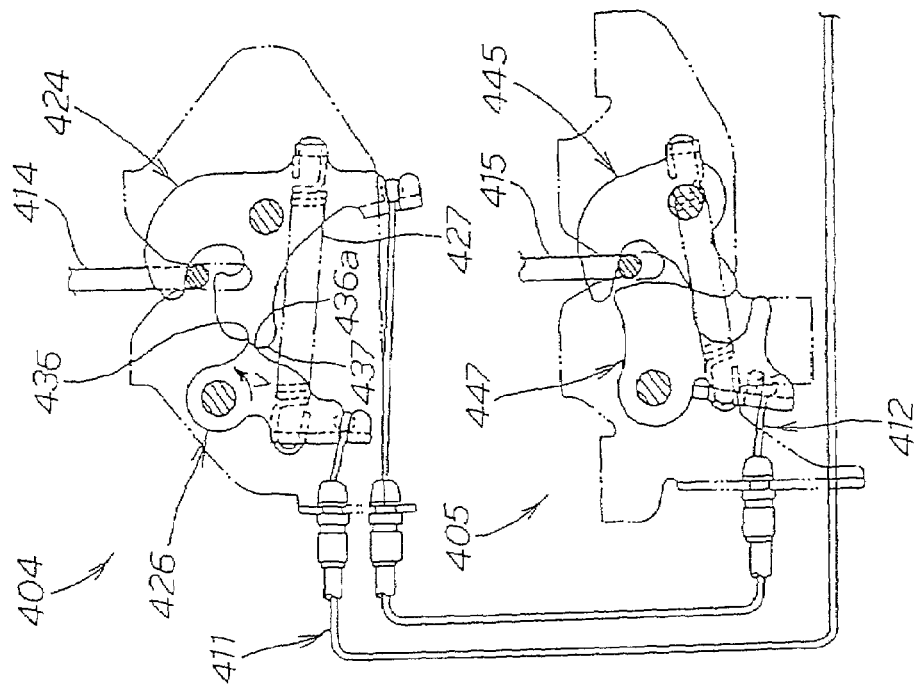
FIGS. 21(a) and (b) are third explanatory drawings illustrating the operation of the seat attachment structure of the motorcycle according to the present invention.
Figure 21A:
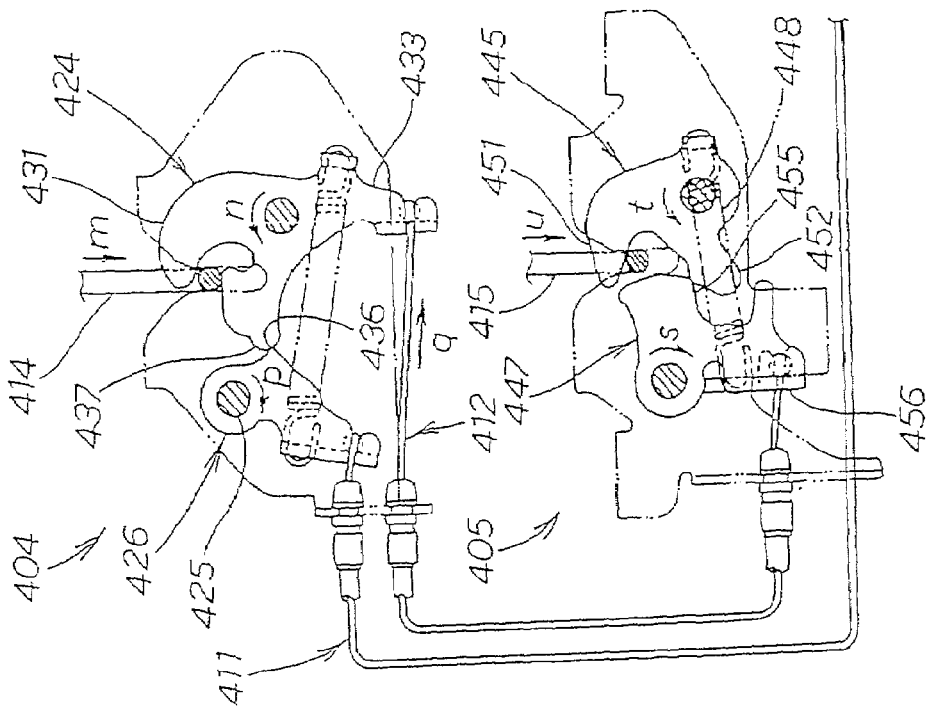

FIGS. 21(a), (b) are third explanatory drawings illustrating the operation of the seat attachment structure of the motorcycle according to the present invention. In FIG. 21(a), when the first seat hook 414 is moved further downward from the state shown in FIG. 20(b) as illustrated by the arrow m, the locking claw 424 of the main locking mechanism 404 further rotates as illustrated by the arrow n, and the lower projection 437 of the locking claw 424 moves over the projecting portion 436 of the stopper member 426. At this moment, the stopper member 426 rotates about the pin 425 as illustrated by the arrow p. Simultaneously, the lower arm portion 433 further pulls the second cable 412 as illustrated by the arrow q with the rotation of the locking claw 424.

When the second cable 412 is pulled, the second cable attaching point 456 of the driving member 447 of the sub-locking mechanism 405 is pulled as illustrated by the arrow r, and the driving member 447 further rotates as illustrated by the arrow s. Then, the jaw 455 of the driving member 447 further presses the lower claw 452 of the locking claw 445 downward, thereby rotating the locking claw 445 as illustrated by the arrow t. At this moment, the second seat hook 415 provided at the lower portion of the seat moves downward in almost the same manner as the first seat hook 414 as illustrated by the arrow u.

In FIG. 21(b), after the lower projection 437 of the locking claw 424 of the main locking mechanism 404 moves over the projecting portion 436 of the stopper member 426, the stopper member 426 rotates as illustrated by the arrow v by the tensile force of the tension coil spring 427, and the inclined portion 436a of the stopper member 426 abuts against the lower projection 437 of the locking claw 424. Accordingly, the inclined portion 436a of the stopper member 426 serves as a stopper and restrains the clockwise rotation of the locking claw 424. In other words, in the main locking mechanism 404, the locking claw 424 is brought into the locked state in which the locking claw 424 engages the first seat hook 414.

At this moment, since the second cable 412 connected to the driving member 447 is maintained in the pulled state in the sub-locking mechanism 405, the driving member 447 restrains the locking claw 445 from rotating clockwise. In other words, the locking claw 445 is brought into the locked state in which it engages the second seat hook 415.

The locked state both between the first seat hook 414 and the main locking mechanism 404 and between the second seat hook 415 and the sub locking mechanism 405 may be released, in FIG. 15, by inserting the key 407 into the keyhole 406 of the seat lock 265, rotating the same, and rotating the arm portion 408.

Consequently, as shown in FIG. 21(b), the first cable 411 is pulled and the stopper member 426 rotates in the direction opposite from the direction illustrated by the arrow v, and the projecting portion 436 of the stopper member 426 moved downward to move over the lower projection 437 of the locking claw 424 into the state shown in FIG. 21(a). Therefore, the locking claw 424 rotates in the direction opposite from the direction illustrated by the arrow n by a tensile force of the tension coil spring 427, and the first seat hook 414 is released from the upper claw 431 of the locking claw 424. As a consequence, the first seat hook 414 and the main locking mechanism 404 do not engage with each other and thus are brought into a released state.

In FIG. 21(a), the second cable 412 is pulled in the direction opposite from the direction illustrated by the arrow q because of the rotation of the aforementioned locking claw 424 in the opposite direction from the direction illustrated by the arrow n and of a tensile force of the tension coil spring 448 of the sub-locking mechanism 405. Consequently, the driving member 447 of the sub-locking mechanism 405 rotates in the direction opposite from the direction illustrated by the arrow s, and the locking claw 445 rotates in the direction opposite from the direction illustrated by the arrow t with the lower claw 452 of the locking claw 445 abutting against the jaw 455 in association with elevation of the jaw 455, so that the second seat hook 415 is released from the upper claw 451 of the locking claw 445. As a consequence, the second seat hook 415 and the sub-locking mechanism 405 do not engage with each other and thus are brought into unlocked state.

As is described thus far in conjunction with FIG. 3, FIG. 16, and FIGS. 19(a)–(c), the present invention comprises a seat attachment structure for a motorcycle 10 wherein an opening 207c of the storage box 207 for storing a helmet Hf, Hr or the like is closed by a seat 208 which is elongated in the fore-and-aft direction and being attached with a seat hinge 401 so as to be opened and closed freely, a first and second seat hooks 414, 415 are attached on the seat bottom plate 208d of the seat 208, and a main locking mechanism 404 and sub-locking mechanism 405 are attached on the vehicle body frame 110 for being engaged respectively with the first and second seat hooks 414, 415 respectively, so that the seat is locked by the main and sub-locking mechanisms 404, 405. The hinge 401 is attached at one end of the seat 208, the first seat hook 414 is attached at the other end of the seat 208, the second seat hook 415 is attached substantially at the center of the seat 208, the main locking mechanism 404 and the sub-locking mechanism 405 are connected by a second cable 412. Thus, when the main locking mechanism 404 is locked by the external force, the sub-locking mechanism 405 is also brought into the locked state in conjunction therewith.

When locking the main locking mechanism 404, the sub-locking mechanism 405 may also be brought into the locked state in conjunction therewith. Therefore, the locking operation of the main and sub-locking mechanisms 404, 405 may be performed easily and reliably as a single operation. Consequently, the present invention eliminates the requirement of getting used to the operation of the seat, as in the case of the related art, in which a plurality of locking mechanisms are provided at a plurality of locations.

By providing the first seat hook 414 at the other end of the seat 208, the first seat hook 414 may be positioned at the farthest point form the seat hinge 401 attached at one end of the seat 208 and thus the distance L3 between the seat hinge 401 and the first seat hook 414 may be maximized. Therefore, when locking the main locking mechanism 404 by pressing the end of the seat 208 above the main locking mechanism 404 downward by hand, a downward pressing force F1 required to be exerted on the seat 208 for generating a moment about the sea hinge 401 may be reduced.

For example, the present invention employs a structure wherein the seat hook for the main locking mechanism is attached at the center of the seat, and the seat hook for the sub-locking mechanism is attached at the other end of the seat. Thus, according to the present invention, only a small operating force F1 pressing on the central portion of the seat 208 is required for locking the seat. By contrast, in conventional structures in which the seat hook for the main locking mechanism is attached at the center of the seat and the seat hook for the sub-locking mechanism is attached at the other end of the seat, a larger force F2 is required, since the seat is closed by pressing downward on the central portion of the seat. Further, as is described in conjunction with FIG. 15 of the present invention, even with the damper 416 attached on the seat 208, the seat 208 can be reliably locked with a smaller operating force than the case of the related art.

Secondly, in the present invention the first and second seat hooks 414, 415 are formed into angular U-shape having straight portions 414a, 415a along the length of the seat 208 so that the straight portions 414a, 415a may be engaged with the main and sub-locking mechanisms 404, 405 respectively.

Further, in the present invention, any problems in locking the main and sub-locking mechanisms that might result from dimensional errors of the seat hook, the main locking mechanism, and the sub locking mechanism, errors in attachment of these members, or the errors in engaging the seat hook and each locking mechanism due to the rigidity of the seat, are eliminated due to the length of the seat.

In the embodiment of the present invention, the seat hinge is attached at the front end of the seat, the seat hook for the main locking mechanism is attached at the rear end of the seat, and the seat hook for the sub-locking mechanism is attached substantially at the center of the seat. However, it is not limited thereto, and it is also possible to attach the seat hinge at the rear end of the seat, to attach the seat hook for the main locking mechanism at the front end of the seat, and to attach the seat hook for the sub-locking mechanism substantially at the center of the seat.

The present invention with the aforementioned construction will provide the following advantages.

First, since the hinge is attached at one end of the seat, the seat hook for the main locking mechanism is attached at the other end of the seat, the seat hook for the sub-locking mechanism is attached substantially at the center of the seat, and the main locking mechanism and the sub-locking mechanism are connected by a connecting member such as a wire or the like, sub-locking mechanism may also be brought into the locked state in conjunction therewith when locking the main locking mechanism. Therefore, the locking operation of the main and sub-locking mechanisms may be easily and reliably performed as a single operation. Consequently, the present invention eliminates the requirement of getting used to the operation of the seat, as in the case of the related art, in which a plurality of locking mechanisms are provided at a plurality of locations.

Second, by providing a seat hook for the main locking mechanism at the other end of the seat, the seat hook for the main locking mechanism may be positioned at the farthest point form the hinge attached at one end of the seat. Therefore, when locking the main locking mechanism by pressing the end of the seat above the main locking mechanism downward by hand, a downward pressing force required to be exerted on the seat for generating a moment about the hinge may be reduced. As such, only a small operating force is required for locking the seat. By contrast, in conventional structures in which the seat hook for the main locking mechanism is attached at the center of the seat and the seat hook for the sub-locking mechanism is attached at the other end of the seat, a larger force is required, since the seat is closed by pressing downward on the central portion of the seat.

Also, each of the seat hooks is formed into an angular U-shape having a straight portion along the length of the seat so that the straight portions are engaged with the main and sub locking mechanisms respectively. Thus, in the present invention, any problems in locking the main and sub-locking mechanisms that might result from dimensional errors of the seat hook, the main locking mechanism, and the sub-locking mechanism, errors in attachment of these members, or the errors in engaging the seat hook and each locking mechanism due to the rigidity of the seat, are eliminated due to the length of the seat.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat attachment structure mounted on a vehicle body comprising:
   a storage box openable and closable by a seat which is elongated in the fore-and-aft direction;
   a hinge attached to the seat for freely opening and closing the storage box;
   a plurality of seat hooks attached on a lower surface of the seat;
   a main locking mechanism and a sub-locking mechanism attached on the vehicle body for being engaged respectively with the seat hooks, so that the seat is locked by the main and sub-locking mechanisms, wherein
   the hinge connecting one end of the seat and to a point substantially at a center of a curved member bridging between right and left frame members of the vehicle body,
   the seat hook for the main locking mechanism is attached at an opposite end of the seat,
   the seat hook for the sub-locking mechanism is attached substantially at a center of the seat, and
   the main locking mechanism and the sub-locking mechanism are connected by a connecting member, so that when the main locking mechanism is locked by a downward pressing force for closing the seat, the sub-locking mechanism is also brought into the locked state in conjunction with said connecting member operated by said downward pressing force for closing the seat,
   wherein the main locking mechanism comprises:
   a housing formed with a U-shaped groove;
   a locking claw rotatably mounted on the housing via a pin;
   a stopper member rotatably mounted on the housing via a pin for holding the locking claw at the locking position; and
   a tension coil spring laid between the locking claw and the stopper member for pulling the locking claw to the unlocking direction and pulling the stopper member counterclockwise.

2. A seat attachment structure mounted on a vehicle body comprising:
   a storage box openable and closable by a seat which is elongated in the fore-and-aft direction;
   a hinge attached to the seat for freely opening and closing the storage box;
   a plurality of seat hooks attached on a lower surface of the seat;
   a main locking mechanism and a sub-locking mechanism attached on the vehicle body for being engaged respectively with the seat hooks, so that the seat is locked by the main and sub-locking mechanisms, wherein
   the hinge connecting one end of the seat and to a point substantially at a center of a curved member bridging between right and left frame members of the vehicle body,
   the seat hook for the main locking mechanism is attached at an opposite end of the seat,
   the seat hook for the sub-locking mechanism is attached substantially at a center of the seat, and
   the main locking mechanism and the sub-locking mechanism are connected by a connecting member, so that when the main locking mechanism is locked by a downward pressing force for closing the seat, the sub-locking mechanism is also brought into the locked state in conjunction with said connecting member operated by said downward pressing force for closing the seat wherein the sub-locking mechanism comprises:
   a housing formed with a U-shaped groove;
   a locking claw rotatably mounted on the housing via a pin;
   a driving member rotatably mounted on the housing via a pin for rotating the locking claw; and
   a tension coil spring laid between the locking claw and the driving member for pulling the locking claw in the unlocking direction and pulling the driving member counterclockwise.

3. The seat attachment structure according to claim 2, further comprising a damper member attached at one end thereof to the vehicle body and at an opposite end thereto to the seat for generating an upward force corresponding to a net weight of the seat.

4. The seat attachment structure according to claim 3, wherein the damper member is attached to the seat between the hinge and the sub-locking mechanism.

5. The seat attachment structure according to claim 2, wherein the seat hinge is attached at a front end of the seat.

6. The seat attachment structure according to claim 2, wherein the seat hinge is attached at a rear end of the seat.

7. A vehicle comprising:
   a vehicle body having a pair of rear frames;
   a plurality of cross members laid between the rear frames;
   a storage box openable and closable by a seat which is elongated in the fore-and-aft direction;
   a hinge attached to one of the cross members at substantially a center point thereof and to one end of the seat for freely opening and closing the storage box;
   a plurality of seat hooks attached on a lower surface of the seat;
   a main locking mechanism and a sub-locking mechanism each attached on another of said plurality of cross members for being engaged respectively with the seat hooks, so that the seat is locked by the main and sub-locking mechanisms, wherein the seat hook for the main locking mechanism is attached at an opposite end of the seat, the seat hook for the sub-locking mechanism is attached substantially at a center of the seat, and the main locking mechanism and the sub-locking mechanism are connected by a connecting member, so that when the main locking mechanism is locked by the external force, the sub-locking mechanism is also brought into the locked state in conjunction therewith.

8. The vehicle according to claim 7, wherein each of the seat hooks is formed into an angular U-shape having a straight portion along the length of the seat, so that the straight portions thereof are engaged with the main and sub-locking mechanisms respectively.

9. The vehicle according to claim 7, wherein the main locking mechanism comprises:

a housing formed with a U-shaped groove;

a locking claw rotatably mounted on the housing via a pin;

a stopper member rotatably mounted on the housing via a pin for holding the locking claw at the locking position; and a tension coil spring laid between the locking claw and the stopper member for pulling the locking claw to the unlocking direction and pulling the stopper member counterclockwise.

10. The vehicle according to claim 7, wherein the sub-locking mechanism comprises:

a housing formed with a U-shaped groove;

a locking claw rotatably mounted on the housing via a pin;

a driving member rotatably mounted on the housing via a pin for rotating the locking claw;

and a tension coil spring laid between the locking claw and the driving member for pulling the locking claw in the unlocking direction and pulling the driving member counterclockwise.

11. The vehicle according to claim 7 further comprising a damper member attached at one end thereof to the vehicle body and at an opposite to the seat for generating an upward force corresponding to a net weight of the seat.

12. The vehicle according to claim 11, wherein the damper member is attached to the seat between the hinge and the sub-locking mechanism.

13. The vehicle according to claim 7 wherein the seat hinge is attached at a front end of the seat.

14. The vehicle according to claim 7, wherein the seat hinge is attached at a rear end of the seat.

* * * * *